US012767514B2

(12) United States Patent
Danielson et al.

(10) Patent No.: US 12,767,514 B2
(45) Date of Patent: Oct. 20, 2026

(54) MONITORING EQUILIBRIUM AND DISPENSEMENT OF A FLUID DISPENSEMENT SYSTEM TO IMPROVE QUALITY AND EFFICIENCY

(71) Applicant: BarTrack, Inc., Sterling, VA (US)

(72) Inventors: Brett Danielson, Vienna, VA (US); Grant Hobar, Herndon, VA (US); David Atherton, Purcellville, VA (US)

(73) Assignee: BARTRACK, INC., Sterling, VA (US)

( * ) Notice: Subject to any disclaimer, the term of this patent is extended or adjusted under 35 U.S.C. 154(b) by 335 days.

(21) Appl. No.: 18/160,059

(22) Filed: Jan. 26, 2023

(65) Prior Publication Data

US 2023/0166960 A1 Jun. 1, 2023

Related U.S. Application Data

(63) Continuation-in-part of application No. 16/797,790, filed on Feb. 21, 2020, now Pat. No. 12,180,056.

(60) Provisional application No. 63/267,253, filed on Jan. 28, 2022.

(51) Int. Cl.

| | |
|---|---|
| ***B67D 1/08*** | (2006.01) |
| ***B67D 1/12*** | (2006.01) |
| ***G06Q 10/087*** | (2023.01) |

(52) U.S. Cl.

CPC ......... *B67D 1/0888* (2013.01); *B67D 1/0855* (2013.01); *B67D 1/0857* (2013.01); *B67D 1/1234* (2013.01); *G06Q 10/087* (2013.01)

(58) Field of Classification Search

CPC ................ B67D 1/0888; B67D 1/0855; B67D 1/10857; B67D 1/1234; G06Q 10/087

See application file for complete search history.

(56) References Cited

U.S. PATENT DOCUMENTS 3,935,735 A * 2/1976 Lee ........................ G01F 1/667 73/861.29
4,094,445 A 6/1978 Bevan
4,676,400 A 6/1987 Lamont et al.

(Continued)

FOREIGN PATENT DOCUMENTS

EP 2813845 B1 * 7/2018 ........... G01N 29/024
GB 2327748 A 2/1999

(Continued)

OTHER PUBLICATIONS

PCT Third Party Observation, Submitted, May 27, 2024.

*Primary Examiner* — Jeremy Carroll

(74) *Attorney, Agent, or Firm* — Welsh Flaxman & Gitler LLC

(57) ABSTRACT

A beverage monitoring system is provided for a beverage system that includes a pressurized gas source, pressurized gas regulators, pressurized gas distribution lines, beverage distribution lines, beverage vessels, and beverage dispensers. The beverage monitoring system comprises at least one gateway that includes a processor, a network interface connected to dispensers, and a network interface connected to sensor assemblies. The beverage monitoring system also includes a sensor assembly. The sensor assembly is configured to run diagnostics to diagnose a potential problem with the line, or provide consolidated information for correlation with point-of-sale data.

11 Claims, 25 Drawing Sheets

(56) References Cited

U.S. PATENT DOCUMENTS

| | | | | |
|---|---|---|---|---|
| 4,949,552 | A | 8/1990 | Adams | |
| 5,009,082 | A | 4/1991 | Abraham | |
| 5,192,000 | A | 3/1993 | Wandrick et al. | |
| 5,372,014 | A | 12/1994 | Adams | |
| 5,564,602 | A | 10/1996 | Cleland et al. | |
| 5,732,856 | A | 3/1998 | Fry | |
| 5,743,107 | A | 4/1998 | Kyees | |
| 5,841,027 | A | 11/1998 | Scarffe | |
| 5,922,969 | A | 7/1999 | Haar | |
| 5,996,842 | A | 12/1999 | Riley et al. | |
| 6,431,403 | B1 | 8/2002 | Davis | |
| 6,487,873 | B2 | 12/2002 | Kyees | |
| 6,609,391 | B2 | 8/2003 | Davis | |
| 7,191,614 | B2 | 3/2007 | Hess et al. | |
| 7,373,784 | B2 * | 5/2008 | Haskayne | B67D 1/0862 222/146.6 |
| 7,389,647 | B1 | 6/2008 | Abraham | |
| 7,516,623 | B2 | 4/2009 | Hall | |
| 7,743,624 | B2 | 6/2010 | Schneller et al. | |
| 7,802,445 | B2 | 9/2010 | Winters | |
| 7,805,978 | B2 * | 10/2010 | Riley | G01N 29/2468 73/19.03 |
| 7,823,411 | B2 | 11/2010 | Gagliano et al. | |
| 9,027,792 | B2 | 5/2015 | Watts | |
| 9,404,891 | B2 * | 8/2016 | Lih | G01N 29/024 |
| 9,551,604 | B2 * | 1/2017 | Hayashi | G01F 1/7082 |
| 9,823,002 | B1 | 11/2017 | Delgado et al. | |
| 9,989,296 | B2 | 6/2018 | Pavlik | |
| 10,465,960 | B2 | 11/2019 | Prabhakaran | |
| 10,562,750 | B2 | 2/2020 | Peirsman et al. | |
| 10,641,532 | B2 | 5/2020 | Dalmolin | |
| 10,865,093 | B2 | 12/2020 | Yang | |
| 10,989,464 | B2 | 4/2021 | Dalmolin | |
| 2004/0089371 | A1 | 5/2004 | Few | |
| 2004/0256278 | A1 | 12/2004 | Kett et al. | |
| 2005/0224075 | A1 | 10/2005 | Childers et al. | |
| 2009/0069934 | A1 | 3/2009 | Newman et al. | |
| 2009/0173099 | A1 | 7/2009 | Gumennyy | |
| 2009/0293989 | A1 | 12/2009 | Yang et al. | |
| 2010/0089943 | A1 | 4/2010 | Till | |
| 2010/0127017 | A1 | 5/2010 | Biesheuvel | |
| 2014/0069279 | A1 | 3/2014 | Upston et al. | |
| 2016/0355389 | A1 | 12/2016 | Bursey et al. | |
| 2017/0210610 | A1 | 7/2017 | Henson et al. | |
| 2017/0337496 | A1 * | 11/2017 | Jones | G06Q 10/0833 |
| 2019/0135607 | A1 | 5/2019 | Petermann | |
| 2019/0292037 | A1 | 9/2019 | Nicol et al. | |
| 2021/0139309 | A1 * | 5/2021 | Alpmen | G06Q 30/0631 |
| 2021/0215419 | A1 | 7/2021 | Dalmolin | |
| 2021/0261400 | A1 | 8/2021 | Danielson et al. | |
| 2025/0258137 | A1 * | 8/2025 | Gwynn | G01N 29/032 |

FOREIGN PATENT DOCUMENTS

| | | | |
|---|---|---|---|
| JP | 2004226391 | A | 8/2004 |
| JP | 4241534 | B2 | 3/2009 |
| WO | 2009032875 | A2 | 3/2009 |
| WO | 2013177554 | A1 | 11/2013 |
| WO | WO 2018236758 | A1 † | 12/2018 |

* cited by examiner
† cited by third party

Beer Colors and SRM Value

| Beer Swatch | SRM | Color |
|---|---|---|
| | 2 | Pale Straw |
| | 3 | Straw |
| | 4 | Pale Gold |
| | 6 | Deep Gold |
| | 9 | Pale Amber |
| | 12 | Medium Amber |
| | 15 | Deep Amber |
| | 18 | Amber-Brown |
| | 20 | Brown |
| | 24 | Ruby Brown |
| | 30 | Deep Brown |
| | 40 | Black |

Beer Style SRM Color Ranges

| Style | SRM Range |
|---|---|
| Pilsner | 2 - 7 |
| Witbier, Berliner Weisse | 2 - 4 |
| Belgian Strong Ale | 4 - 7 |
| Maibock | 4 - 10 |
| Vienna Lager | 7 - 14 |
| Oktoberfest | 4 - 12 |
| American Pale Ale | 6 - 14 |
| Pale Ale | 5 - 14 |
| English Golden Ale | 4 - 8 |
| Bavarian Weizen | 4 - 10 |
| Bitter, ESB | 8 - 14 |
| Marzen | 7 - 15 |
| Imperial Pale Ale | 5 - 11 |
| Biere de Garde | 6 - 13 |
| Dunkel Weizen | 9 - 13 |
| Amber Ale | 11 - 18 |
| English Brown Ale | 12 - 22 |
| Bock | 15 - 30 |
| Porter | 20 - 40 |
| Oatmeal Stout | 25 - 40 |
| Baltic Porter | 17 - 40 |
| Foreign Stout | 30 - 55 |
| Imperial Stout | 50 -80 |

FIG. 6

This graph depicts the relationship pf the Cooler Temperature ( ——— ) and Line Temperature(- - - - - -). You can see the cyclical oscillation of the cooler fan engaging, bringing the temperature back down and repeating.

BarTrack Daily Report
The Bronson Bierhall 01/07/2022 - Friday

| Summary | | | | | | | | | | | | | | | | | | |
|---|---|---|---|---|---|---|---|---|---|---|---|---|---|---|---|---|---|---|
| QUANTITY (OZ) | | REVENUE | COST | PROFIT | POUR COST | GOAL | KEG BREAKDOWN | | | | | | | | OZ LOST | PROFIT LOST | MANAGEMENT SAVINGS | |
| | | | | | | | SOLD 1 | WASTE 2 | *HUMAN 3* | *OVER 4* | *UNDER 4* | *QUALITY 5* | *COMP 6* | *SYSTEM 7* | | | COST | REVENUE |
| Overall | 12,723 | $5,496.87 | $1,144.60 | $4,337.00 | 20.8% | -$243 | 96% | 4% | < 1% | 4% | - 1% | < 1% | < 1% | < 1% | 565 | $255 | $193 | $938 |

Hourly Breakdown of Pours vs. Sales

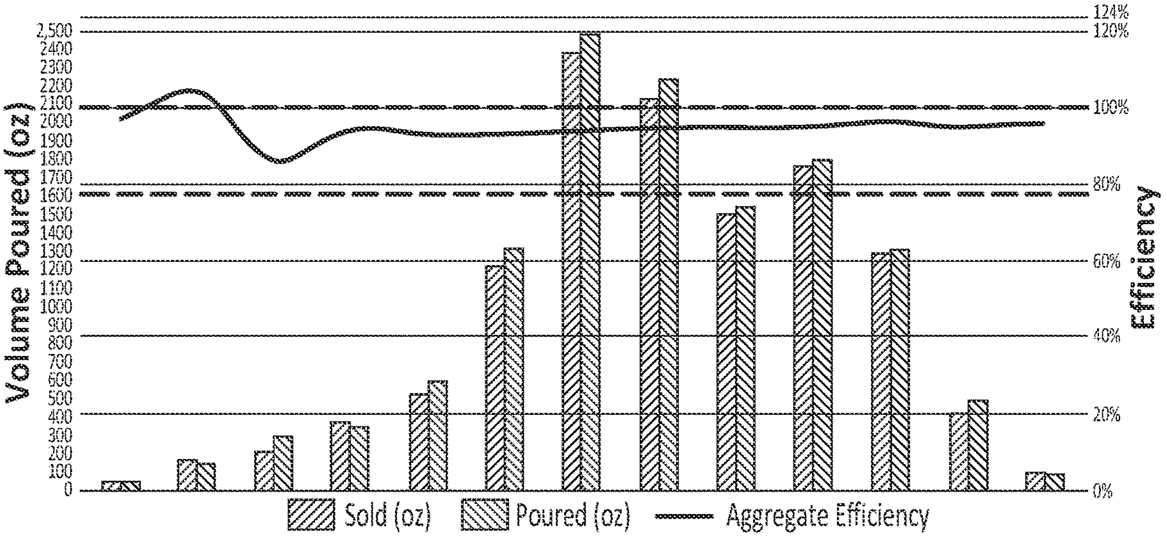

| Time | 12PM | 1PM | 2PM | 3PM | 4PM | 5PM | 6PM | 7PM | 8PM | 9PM | 10PM | 11PM | 12AM | 12AM |
|---|---|---|---|---|---|---|---|---|---|---|---|---|---|---|
| Volume | -1oz | 9oz | -81oz | 22oz | -47oz | -90oz | -106oz | -112oz | -39oz | -44oz | -21oz | -72oz | 15oz | -567oz |

Draft Performance

- Your average Pour Cost for the day is 20.8%, which is 0.8% above your target of 20%
- 11 of your 17 beverages had a Pour Cost that exceeded your target of 20%
- 11 of your 17 beverages had a negative Goal
- All of your beverages had Sales and Pours
- 3 of your 17 beverages had efficiencies below 77%
- 1 of your 17 beverages had Sales with no Volume Poured
- None of your lines had Volume Poured with no beverage connected in the BarTrack application

Draft Quality Breakdown

- Your average Line Temperature was between 38°F and 40°F for 95% of the day
- Your average Cooler Temperature was between 41°F and 44°F for 95% of the day
- Your average Line Pressure was normal for 98% of the day
- Your lines experiencing the most Low Pressure issues are:
  - Line-9 (14%), Line-11 (8%), Line-6 (4%)
- None of your lines appear to have experienced High Temperature issues during the reporting period

Thresholds

Your average Human waste for the day is < 1%, which is on par with your target of 10%
Your average Overpour waste for the day is 4%, which is 1% below your target of 5%
Your average Underpour waste for the day is -1%, which is 4% above your target of -5%
Your average Comp waste for the day is < 1%, which is on par with your target of 5%
Your average Quality waste for the day is < 1%, which is on par with your target of 5%

FIG. 18A

BarTrack Daily Report
The Bronson Bierhall 01/07/2022 - Friday

Insights

Summary

| QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|
| Overall | 12,723 | $5,496.87 | $1,144.60 | $4,337.00 | 20.8% | -$243 | 96% | 4% | < 1% | 4% | - 1% | < 1% | < 1% | < 1% | 565 | $255 | $193 | $938 |
| 1/2 BBL | 8,471 | $3,763.25 | $737.19 | $3,010.79 | 19.6% | $61 | 96% | 4% | < 1% | 4% | - 1% | < 1% | < 0% | < 1% | 339 | $157 | $133 | $683 |
| European | 4,127 | $1,583.23 | $390.35 | $1,192.88 | 24.7% | -$349 | 90% | 10% | 3% | 5% | - 1% | < 1% | -1% | < 1% | 396 | $166 | $56 | $239 |
| 1/4 BBL | 124 | $70.39 | $17.06 | $53.33 | 24.2% | $35 | 101% | -1% | < 1% | 0% | - 1% | <0% | < 0% | < 1% | -2 | -$1 | $4 | $16 |
| General Sales | - | $80.00 | - | $80.00 | - | $80 | - | - | - | - | - | - | - | - | -168 | -$80 | - | - |

Performance

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|---|
| Partly Cloudy | Overall | 12,723 | $5,496.87 | $1,144.60 | $4,337.00 | 20.8% | -$243 | 96% | 4% | < 1% | 4% | - 1% | < 1% | < 1% | < 1% | 565 | $255 | $193 | $938 |

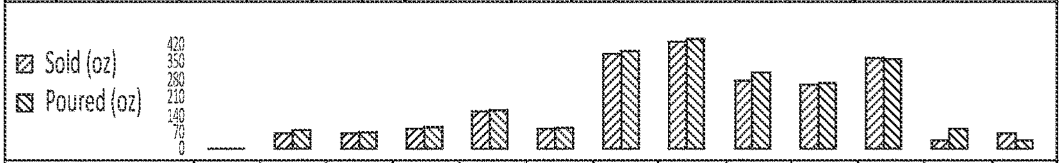

| | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| Line-3 | Volume | COST | -8oz | -3oz | -4oz | -6oz | -2oz | -11oz | -19oz | -29oz | -3oz | 2oz | -52oz | 31oz |

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|---|
| ORIGINAL MUNICH LAGER | Overall | 12,723 | $5,496.87 | $1,144.60 | $4,337.00 | 20.8% | -$243 | 96% | 4% | < 1% | 4% | - 1% | < 1% | < 1% | < 1% | 565 | $255 | $193 | $938 |

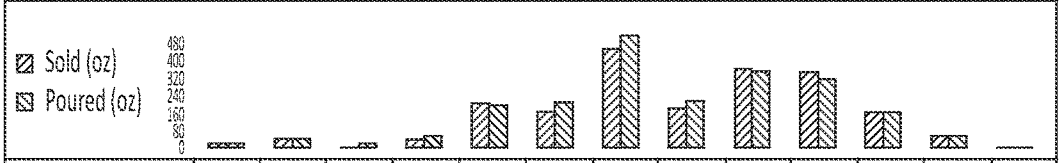

| | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| Line-2 | Volume | 0oz | 0oz | -18oz | -17oz | 6oz | -48oz | -66oz | -31oz | 7oz | 26oz | -2oz | 2oz | - |

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|---|
| Pils | Overall | 12,723 | $5,496.87 | $1,144.60 | $4,337.00 | 20.8% | -$243 | 96% | 4% | < 1% | 4% | - 1% | < 1% | < 1% | < 1% | 565 | $255 | $193 | $938 |

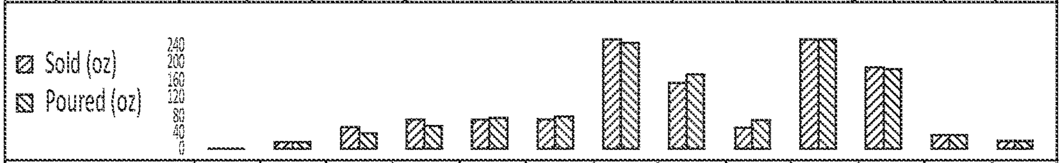

| | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| Line-15 | Volume | - | 0oz | 16oz | 14oz | -2oz | -3oz | 7oz | -18oz | -17oz | -1oz | 3oz | 0oz | 0oz |

FIG. 18B

BarTrack Daily Report
The Bronson Bierhall 01/07/2022 - Friday

| BEVERAGE | QUANTITY (OZ) | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|
| Power Moves | 1/2 BBL 771 | $276.30 | $69.94 | $206.36 | 25.3% | -$75 | 87% | 13% | 7% | 5% | 0% | 0% | 0% | < 1% | 96 | $40 | $7 | $26 |

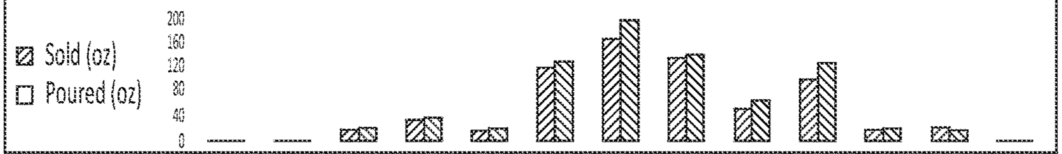

| Line-1 | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| | Volume | COST | -2oz | -2oz | -7oz | -2oz | -8oz | -32oz | -8oz | -17oz | -26oz | -3oz | -4oz | - |

| BEVERAGE | QUANTITY (OZ) | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|
| Wahgo | 1/2 BBL 734 | $530.70 | $64.75 | $465.95 | 12.2% | $207 | 94% | 6% | < 1% | 5% | 0% | < 1% | 0% | 0% | 44 | $34 | $1 | $88 |

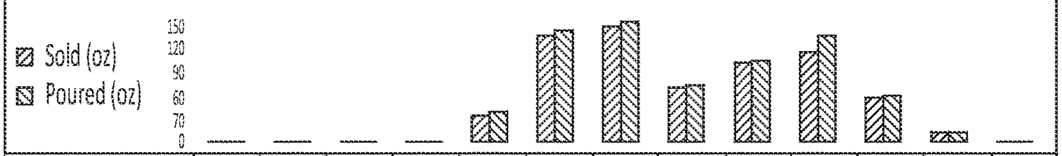

| Line-16 | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| | Volume | - | - | - | - | -4oz | -6oz | -7oz | -3oz | -2oz | -22oz | -1oz | 0oz | - |

| BEVERAGE | QUANTITY (OZ) | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|
| Optimal® Wit | 1/2 BBL 734 | $298.86 | $59.16 | $239.70 | 19.8% | $3 | 94% | 6% | 3% | 3% | 0% | < 1% | 0% | 0% | 44 | $219 | $10 | $49 |

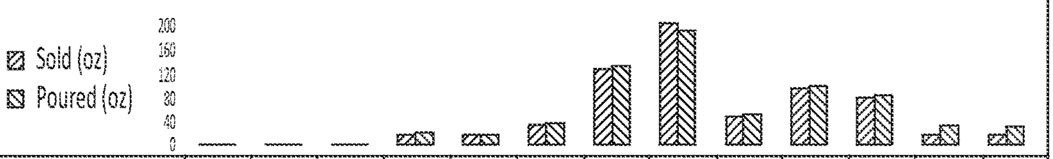

| Line-12 | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| | Volume | 0oz | 0oz | -18oz | -17oz | 6oz | -48oz | -66oz | -31oz | 7oz | 26oz | -2oz | 2oz | - |

| BEVERAGE | QUANTITY (OZ) | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|
| Reissdorf Kolsch | European 687 | $329.18 | $75.27 | $253.91 | 22.9% | -$12 | 96% | 4% | < 2% | 6% | 0% | 0% | 0% | < 1% | 31 | $15 | $14 | $61 |

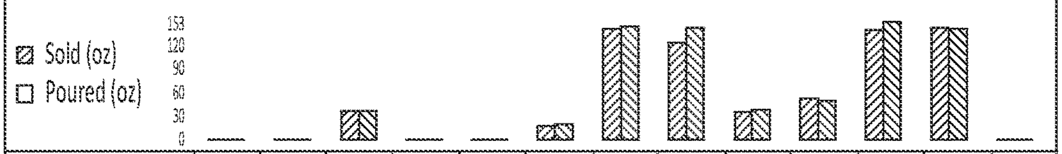

| Line-5 | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| | Volume | - | - | 0oz | - | - | -1oz | -2oz | -18oz | -1oz | 1oz | -8oz | 1oz | - |

FIG. 18C

BarTrack Daily Report
The Bronson Bierhall 01/07/2022 - Friday

| BEVERAGE | QUANTITY (OZ) | | REVENUE | COST | PROFIT | POUR COST | GOAL | KEG BREAKDOWN | | | | | | | | OZ LOST | PROFIT LOST | MANAGEMENT SAVINGS | |
|---|---|---|---|---|---|---|---|---|---|---|---|---|---|---|---|---|---|---|---|
| | | | | | | | | SOLD 1 | WASTE 2 | *HUMAN 3* | *OVER 4* | *UNDER 4* | *QUALITY 5* | *COMP 6* | *SYSTEM 7* | | | COST | REVENUE |
| Franziskaner | European | 659 | $277.42 | $63.20 | $214.22 | 22.8% | -$239 | 97% | 3% | 1% | 2% | 0% | < 1% | 0% | 0% | 18 | $8 | $12 | $54 |

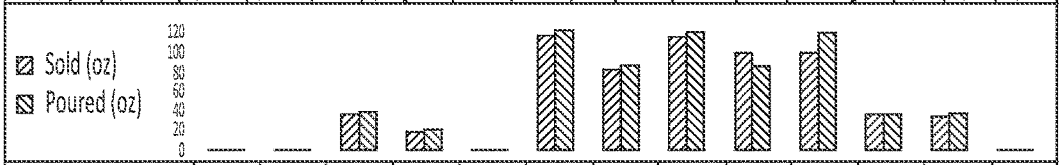

| | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| Line-11 | Volume | - | - | -3oz | -1oz | - | -3oz | -1oz | -3oz | 16oz | -22oz | 0oz | -2oz | - |

| BEVERAGE | QUANTITY (OZ) | | REVENUE | COST | PROFIT | POUR COST | GOAL | KEG BREAKDOWN | | | | | | | | OZ LOST | PROFIT LOST | MANAGEMENT SAVINGS | |
|---|---|---|---|---|---|---|---|---|---|---|---|---|---|---|---|---|---|---|---|
| | | | | | | | | SOLD 1 | WASTE 2 | *HUMAN 3* | *OVER 4* | *UNDER 4* | *QUALITY 5* | *COMP 6* | *SYSTEM 7* | | | COST | REVENUE |
| Nanticoke Nectar | 1/2 BBL | 630 | $271.42 | $55.56 | $207.86 | 20.5% | -$13 | 107% | -7% | -5% | <1% | - 2% | 0% | 0% | 0% | -46 | -$19 | $12 | $61 |

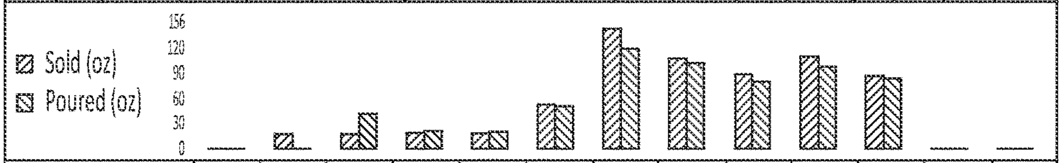

| | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| Line-6 | Volume | - | 18oz | -24oz | -1oz | -2oz | 3oz | 24oz | 7oz | 8oz | 11oz | 2oz | - | - |

| BEVERAGE | QUANTITY (OZ) | | REVENUE | COST | PROFIT | POUR COST | GOAL | KEG BREAKDOWN | | | | | | | | OZ LOST | PROFIT LOST | MANAGEMENT SAVINGS | |
|---|---|---|---|---|---|---|---|---|---|---|---|---|---|---|---|---|---|---|---|
| | | | | | | | | SOLD 1 | WASTE 2 | *HUMAN 3* | *OVER 4* | *UNDER 4* | *QUALITY 5* | *COMP 6* | *SYSTEM 7* | | | COST | REVENUE |
| Manako (Mango White Ale) | 1/2 BBL | 612 | $5,496.87 | $255.23 | $196.63 | 23.0% | -37 | 96% | 4% | 3% | 2% | - 1% | 0% | 0% | 0% | 23 | $10 | $11 | $47 |

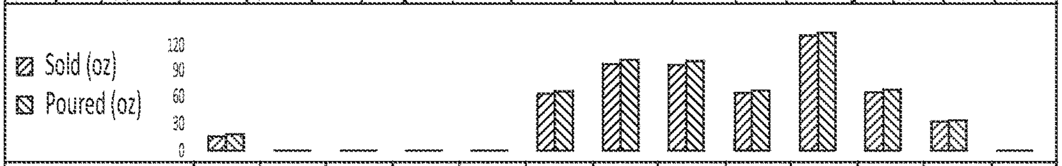

| | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| Line-13 | Volume | -1oz | - | - | - | - | -3oz | -4oz | -4oz | -2oz | -3oz | -4oz | -1oz | - |

| BEVERAGE | QUANTITY (OZ) | | REVENUE | COST | PROFIT | POUR COST | GOAL | KEG BREAKDOWN | | | | | | | | OZ LOST | PROFIT LOST | MANAGEMENT SAVINGS | |
|---|---|---|---|---|---|---|---|---|---|---|---|---|---|---|---|---|---|---|---|
| | | | | | | | | SOLD 1 | WASTE 2 | *HUMAN 3* | *OVER 4* | *UNDER 4* | *QUALITY 5* | *COMP 6* | *SYSTEM 7* | | | COST | REVENUE |
| Weihenstephaner | European | 610 | $174.89 | $59.20 | $115.69 | 33.9% | -$136 | 66% | 34% | 29% | 5% | 0% | 0% | 0% | 0% | 205 | $89 | $0 | $0 |

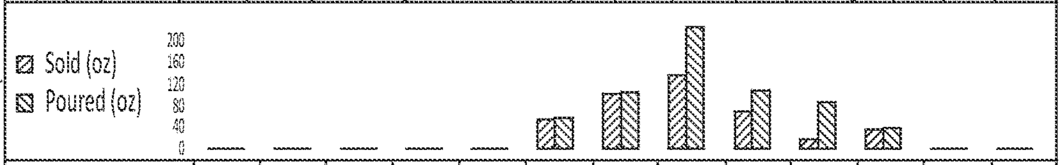

| | Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|---|
| Line-10 | Volume | - | - | - | - | - | -5oz | -3oz | -90oz | -39oz | -68oz | -1oz | - | - |

FIG. 18D

BarTrack Daily Report
The Bronson Bierhall 01/07/2022 - Friday

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | MANAGEMENT SAVINGS REVENUE |
|---|---|---|---|---|---|---|---|---|---|---|---|---|---|---|---|---|---|---|---|
| Papi Chulo | 1/2 BBL | 608 | $246.69 | $55.16 | $191.53 | 22.4% | -$29 | 102% | -2% | < 1% | <1% | - 3% | 0% | 0% | 0% | -13 | $5 | $12 | $56 |

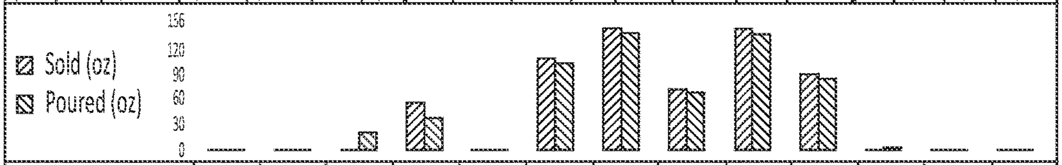

| Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|
| Line-7 Volume | - | - | -19oz | 16oz | - | 4oz | 4oz | 3oz | 5oz | 2oz | -2oz | - | - |

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | MANAGEMENT SAVINGS REVENUE |
|---|---|---|---|---|---|---|---|---|---|---|---|---|---|---|---|---|---|---|---|
| Article One | 1/2 BBL | 394 | $163.80 | $30.79 | $133.01 | 18.8% | $10 | 98% | 2% | 1% | 2% | - 1% | 0% | 0% | 0% | 6 | $3 | $6 | $34 |

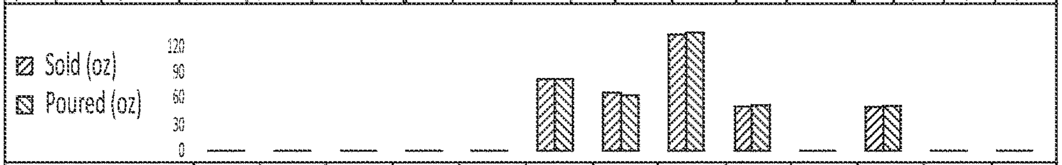

| Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|
| Line-14 Volume | - | - | - | -3oz | - | 0oz | 1oz | -1oz | -1oz | - | -1oz | - | - |

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | MANAGEMENT SAVINGS REVENUE |
|---|---|---|---|---|---|---|---|---|---|---|---|---|---|---|---|---|---|---|---|
| Eggnog Stout | 1/2 BBL | 289 | $192.17 | $25.45 | $159.45 | 13.2% | $58 | 89% | 11% | 2% | 8% | 0% | < 1% | 0% | 0% | 30 | $23 | $3 | $22 |

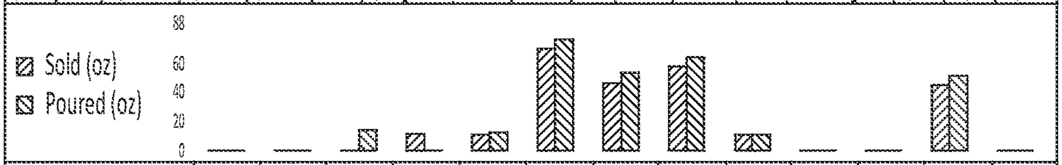

| Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|
| Line-9 Volume | - | - | -14oz | 12oz | -1oz | -8oz | -8oz | -6oz | 0oz | - | - | -5oz | - |

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | MANAGEMENT SAVINGS REVENUE |
|---|---|---|---|---|---|---|---|---|---|---|---|---|---|---|---|---|---|---|---|
| Falcon Smash | 1/4 BBL | 124 | $70.39 | $17.06 | $53.33 | 24.2% | -$35 | 101% | -1% | < 1% | 0% | -1% | 0% | 0% | < 1% | -2 | -$1 | $4 | $16 |

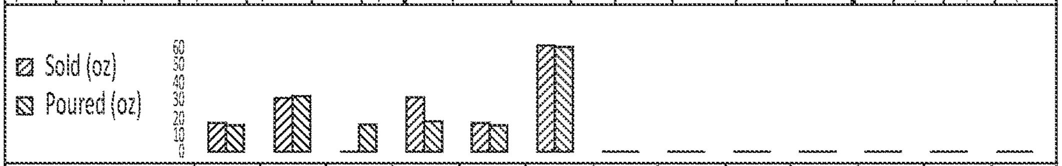

| Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|
| Line-8 Volume | 1oz | -1oz | -12oz | 12oz | 1oz | 1oz | - | - | - | - | - | - | - |

FIG. 18E

BarTrack Daily Report
The Bronson Bierhall 01/07/2022 - Friday

FIG. 18F

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|---|
| Straffe Hendrik Brugs Quadrupel Bier 11° | 1/2 BBL | 72 | $20.00 | $10.59 | $9.41 | 53.0% | -$33 | 32% | 68% | 68% | <1% | 0% | 0% | 0% | 0% | 49 | $42 | $0 | $0 |

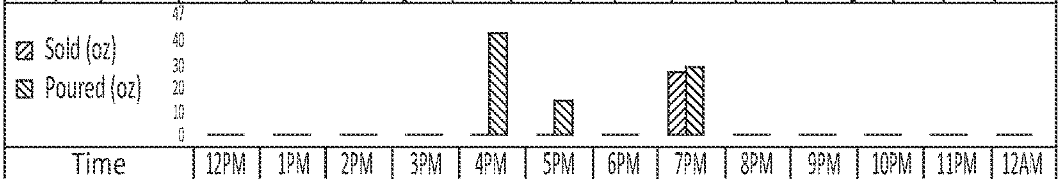

| Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|
| Volume | - | - | - | - | -37oz | -12oz | - | -1oz | - | - | - | - | - |

| BEVERAGE | QUANTITY (OZ) | | REVENUE | COST | PROFIT | POUR COST | GOAL | KEG BREAKDOWN SOLD 1 | WASTE 2 | HUMAN 3 | OVER 4 | UNDER 4 | QUALITY 5 | COMP 6 | SYSTEM 7 | OZ LOST | PROFIT LOST | MANAGEMENT SAVINGS COST | REVENUE |
|---|---|---|---|---|---|---|---|---|---|---|---|---|---|---|---|---|---|---|---|
| Hofbrau Schwarze Weisse/ Dark Wheat /Hefeweizen Dunkel | - | - | $80.00 | - | $80.00 | - | -$80 | - | - | - | - | - | - | - | - | 565 | $255 | $193 | $938 |

| Time | 12PM | 1PM | 2PM | 3PM | 4PM | 5PM | 6PM | 7PM | 8PM | 9PM | 10PM | 11PM | 12AM |
|---|---|---|---|---|---|---|---|---|---|---|---|---|---|
| Volume | - | - | - | - | - | - | - | 67oz | 34oz | 67oz | - | - | - |

System Health

| | PRESSURE LOW | PRESSURE NORMAL | PRESSURE HIGH | TEMPERATURE LOW | TEMPERATURE NORMAL | TEMPERATURE HIGH |
|---|---|---|---|---|---|---|
| Overall | 2% | 98% | 0% | 0% | 100% | 0% |
| Line-1 | 0% | 100% | 0% | 0% | 100% | 0% |
| Line-2 | 2% | 98% | 0% | 0% | 100% | 0% |
| Line-3 | 1% | 99% | 0% | 0% | 100% | 0% |
| Line-4 | 0% | 100% | 0% | 0% | 100% | 0% |
| Line-5 | 2% | 98% | 0% | 0% | 100% | 0% |
| Line-6 | 4% | 96% | 0% | 0% | 100% | 0% |
| Line-7 | 0% | 100% | 0% | 0% | 100% | 0% |
| Line-8 | 0% | 100% | 0% | 0% | 100% | 0% |
| Line-9 | 14% | 86% | 0% | 0% | 100% | 0% |
| Line-10 | 0% | 100% | 0% | 0% | 100% | 0% |
| Line-11 | 8% | 92% | 0% | 0% | 100% | 0% |
| Line-12 | 2% | 98% | 0% | 0% | 100% | 0% |
| Line-13 | 0% | 100% | 0% | 0% | 100% | 0% |
| Line-14 | 0% | 100% | 0% | 0% | 100% | 0% |
| Line-15 | 3% | 97% | 0% | 0% | 100% | 0% |
| Line-16 | 2% | 98% | 0% | 0% | 100% | 0% |

POS Summary

| BEVERAGE NAME | SKU NAME | GLASS SIZE (OZ) | SOLID VOLUME (OZ) | # OF SALES | # OF VOIDS | TOTAL SOLD VOLUME (OZ) | TOTAL COMPED VOLUME (OZ) | REVENUE | DISCOUNTS | AVERAGE PRICE |
|---|---|---|---|---|---|---|---|---|---|---|
| Article One | 1L Mustang Sally Article One | 40.6 | 33.7 | 3 | 0 | 101.09 | 0.00 | $43.65 | $0.00 | $14.55 |
| | .5L Mustang Sally Article One | 20.3 | 16.8 | 1 | 0 | 16.85 | 0.00 | $5.45 | $0.00 | $5.45 |
| | .5 Mustang Sally Article One | 20.3 | 16.8 | 16 | 0 | 269.58 | 0.00 | $114.70 | $0.00 | $7.17 |

BarTrack Daily Report
The Bronson Bierhall 01/07/2022 - Friday

FIG. 18G

| BEVERAGE NAME | SKU NAME | GLASS SIZE (OZ) | SOLID VOLUME$_8$ (OZ) | # OF SALES | # OF VOIDS | TOTAL SOLD VOLUME (OZ) | TOTAL COMPED VOLUME (OZ) | REVENUE | DISCOUNTS | AVERAGE PRICE |
|---|---|---|---|---|---|---|---|---|---|---|
| Eggnog Stout | 13 oz Brothers Eggnog Stout | 13.0 | 11.7 | 22 | 0 | 257.40 | 0.00 | $192.17 | $0.00 | $8.73 |
| Falcon Smash | Falcon Smash IPA | 14.0 | 12.6 | 10 | 1 | 126.00 | 0.00 | $70.39 | $0.00 | $7.04 |
| Franziskaner | 1L Franziskaner Weissebier | 40.6 | 33.7 | 5 | 0 | 168.49 | 0.00 | $73.10 | $0.00 | $14.62 |
| | .5L Franziskaner Weissebier | 20.3 | 16.8 | 28 | 0 | 471.77 | 0.00 | $204.32 | $0.00 | $7.30 |
| Hofbrau Schwarze Weisse / Dark Wheat / Hefeweizen Dunkel | 1L Weihenstephaner Dunkel Weisse | 40.6 | 33.7 | 5 | 0 | 168.49 | 0.00 | $80.00 | $0.00 | $16.00 |
| Maniko (Mango White Ale) | 1L Ono Manako Mango Wheat | 40.6 | 33.7 | 3 | 0 | 101.09 | 0.00 | $43.65 | $0.00 | $14.55 |
| | .5L Ono Manako MangoWheat | 20.3 | 16.8 | 29 | 0 | 488.62 | 0.00 | $211.58 | $0.00 | $7.30 |
| Nanticoke Nectar | 1L RAR Nanticoke Nectar | 40.6 | 36.5 | 6 | 0 | 219.24 | 0.00 | $91.65 | $0.00 | $15.28 |
| | .5L RAR Nanticoke Nectar | 20.3 | 18.3 | 25 | 0 | 456.75 | 0.00 | $179.77 | $0.00 | $7.17 |
| Optimal ® Wit | 1L Port City Optimal Wit | 40.6 | 33.7 | 1 | 0 | 33.70 | 0.00 | $14.55 | $0.00 | $14.55 |
| | .5L Port City Optimal Wit | 20.3 | 16.8 | 39 | 0 | 657.11 | 0.00 | $284.31 | $0.00 | $7.29 |
| Original Munich Lager | 1L Paulaner Helles Lager | 40.6 | 36.5 | 15 | 0 | 548.10 | 0.00 | $218.41 | $0.00 | $14.56 |
| | .5L Paulaner Helles Lager | 20.3 | 18.3 | 84 | 0 | 1534.68 | 54.81 | $583.33 | $21.81 | $6.94 |
| Papi Chulo | 1L Commonwealth Papi Chulo | 40.6 | 36.5 | 6 | 0 | 219.24 | 0.00 | $87.10 | $0.00 | $14.52 |
| | .5L Commonwealth Papi Chulo IPA | 20.3 | 18.3 | 22 | 0 | 401.94 | 0.00 | $159.59 | $0.00 | $7.25 |
| Partly Cloudy | 1L Solace Partly Cloudy IPA | 40.6 | 33.7 | 16 | 0 | 539.17 | 0.00 | $236.41 | $0.00 | $14.78 |
| | .5L Solace Partly Cloudy IPA | 20.3 | 16.8 | 105 | 0 | 1769.15 | 0.00 | $747.20 | $0.00 | $7.12 |
| Pils | 1L Hardywood Pilsner | 40.6 | 33.7 | 1 | 0 | 404.38 | 0.00 | $178.03 | $0.00 | $14.84 |
| | .5L Hardywood Pilsner | 20.3 | 16.8 | 48 | 0 | 808.75 | 0.00 | $346.44 | $0.00 | $7.22 |
| Power Moves | 1L Aslin Power Moves IPA | 40.6 | 33.7 | 2 | 0 | 67.40 | 0.00 | $29.10 | $0.00 | $14.55 |
| | .5L Aslin Power Moves IPA | 20.3 | 16.8 | 36 | 1 | 606.56 | 0.00 | $247.20 | $0.00 | $6.87 |
| Reissdorf Kolsch | 1L Resissdorf Kolsch | 40.6 | 33.7 | 7 | 0 | 235.89 | 0.00 | $121.11 | $0.00 | $17.30 |
| | .5L Resissdorf Kolsch | 20.3 | 16.8 | 25 | 0 | 421.23 | 0.00 | $208.07 | $0.00 | $8.32 |
| Straffe Hendrik Brugs Quadrupel Bier 11* | 13oz Straffe Hendrik Tripel | 13.0 | 11.7 | 2 | 0 | 23.40 | 0.00 | $20.00 | $0.00 | $10.00 |
| Wahgo | 13oz Aslin Wahgo Sour | 13.0 | 11.7 | 69 | 0 | 690.30 | 0.00 | $530.70 | $0.00 | $8.99 |
| Weihenstephaner | 1L Weihenstephaner Dunkel Weisse | 40.6 | 33.7 | 3 | 0 | 101.09 | 0.00 | $43.65 | $0.00 | $14.55 |
| | .5L Weihenstephaner Dunkel Weisse | 20.3 | 16.8 | 18 | 0 | 303.28 | 0.00 | $131.24 | $0.00 | $7.29 |

*Sold$_1$ : Percentage of product that was sold.
*Waste$_2$ : Percentage of product that was not sold.
*Human$_3$ : Loss from improper Point of Sale or BarTrack system usage.
*Overpour/Underpour$_4$ : Loss that is the result of improper pour technique.
*Quality$_5$ : Loss attributed to Draft System Equilibrium issues such as temperature or pressure.
*Comp$_6$ : Loss that is a result of comped or discounted products in the Point of Sale system.

BarTrack Daily Report
The Bronson Bierhall 01/07/2022 - Friday

*System $_7$ : Loss that is unpreventable, typically associated with line cleaning or tapping a new keg.

*Sold Volume $_8$ : The amount poured into the glass is on average 10% less than the total glass size to account for the head on each pour

FIG. 18H

MONITORING EQUILIBRIUM AND DISPENSEMENT OF A FLUID DISPENSEMENT SYSTEM TO IMPROVE QUALITY AND EFFICIENCY

CROSS REFERENCE TO RELATED APPLICATIONS

This application claims the benefit of U.S. Provisional Patent Application Ser. No. 63/267,253, entitled "MONITORING EQUILIBRIUM AND DISPENSEMENT OF A FLUID DISPENSEMENT SYSTEM TO IMPROVE QUALITY AND EFFICIENCY," filed Jan. 28, 2022, and this application is a continuation in part of U.S. patent application Ser. No. 16/797,790, entitled "MONITORING EQUILIBRIUM AND DISPENSEMENT OF A FLUID DISPENSEMENT SYSTEM TO IMPROVE QUALITY AND EFFICIENCY," filed Feb. 21, 2020, both of which are incorporated herein by reference.

BACKGROUND OF THE INVENTION

1. Field of the Invention

The present disclosure relates generally to monitoring the equilibrium and dispensement of a fluid dispensement system, and more particularly to a draft beverage system in order to, for example, diagnose potential issues, improve the quality of the dispensed fluid, and improve the efficiency of the dispensement process.

2. Description of the Related Art

A fluid dispensement system dispenses a fluid often at a metered rate. One example fluid dispensement system is a draft beverage system, such as that which may be installed at a bar, a restaurant, and/or the like. A draft beverage system may be used to dispense draft beverages, such as beer, cider, soda, juice, and/or the like via a tap.

SUMMARY OF INVENTION

According to some embodiments of the present disclosure, a method may include identifying at least one metric for a fluid flowing through a line from a vessel to a dispenser. The method may include identifying a reference value for the at least one metric for the fluid. The method may include performing an analysis of the fluid based on the at least one metric for the fluid. The method may include comparing the results of the analysis with the reference value. The method may include performing at least one action based on determining that there has been a change in the at least one metric relative to the reference value.

In a variant, the method may include monitoring at least one environmental parameter associated with a storage cabinet. In a variant, the method may include analyzing the at least one environmental parameter in conjunction with analyzing at least one signal quality metric. In a variant, the method may include diagnosing at least one potential problem with the fluid based on the at least one environmental parameter and the at least one signal quality metric.

In a variant, the at least one environmental parameter may comprise at least one of line temperature, line pressure, line fluid volume flow rate, fluid color, fluid spectral signature, degassing of the fluid, flow rate of the fluid, barometric pressure within the storage cabinet, humidity within the storage cabinet, ambient temperature within the storage cabinet, and ambient gas concentrations within the storage cabinet. In a variant, the method may include activating at least one electrical or mechanical component configured to modify at least one of: one or more of the at least one environmental parameters, and one or more of the at least one signal quality metrics.

In a variant, the change in the at least one signal quality metric relative to the at least one signal quality metric may indicate an issue with the flow of the fluid in the line. In a variant, the method may include analyzing the change in the at least one signal quality metric relative to the at least one signal quality metric. In a variant, the method may include remotely or autonomously diagnosing a potential issue with the line as a cause of the issue with the flow based on analyzing the change in at least one signal quality metric relative to the at least one signal quality metric. In a variant, the method may include generating a report including information regarding the potential issue.

According to some embodiments of the present disclosure, an apparatus may include at least one processor, and at least one memory including computer program code. The at least one memory and the computer program code are configured to, with the at least one processor, cause the apparatus at least to identify at least one metric for a fluid flowing through a line from a vessel to a dispenser. The apparatus may identify a reference value for the at least one metric for the fluid. The apparatus may perform an analysis of the fluid based on the at least one metric for the fluid. The apparatus may compare the results of the analysis with the reference value. The method may perform at least one action based on determining that there has been a change in the at least one metric relative to the reference value.

In a variant, the apparatus may comprise at least one sensor associated with a cabinet, wherein the at least one sensor is configured to monitor the fluid flowing through the line. In a variant, the cabinet may be configured to hold the vessel containing the fluid for dispensing through the line to a dispensing unit. In a variant, the at least one sensor may comprise a first ultrasonic transducer and a second ultrasonic transducer. In a variant, the first ultrasonic transducer and the second ultrasonic transducer may be arranged relative to each other to establish a signal path between the first ultrasonic transducer and the second ultrasonic transducer through the fluid. In a variant, the apparatus may comprise a gateway that is configured to provide information from monitoring the fluid flowing through the line to the gateway for processing. In a variant, the first ultrasonic transducer may be configured to receive a signal from a controller. In a variant, the first ultrasonic transducer may be configured to send a first ultrasonic signal at a first transmission time to the second ultrasonic transducer based on receiving the signal from the controller. In a variant, the second transducer may be configured to receive the first ultrasonic signal at a first receipt time and send a second ultrasonic signal to the first ultrasonic transducer at a second transmission time. In a variant, the first ultrasonic transducer may be configured to receive the second ultrasonic signal at a second receipt time.

In a variant, the at least one sensor and the at least one processor may be further configured to receive information regarding one or more of the first transmission time, the first receipt time, the second transmission time, and the second receipt time. In a variant, the at least one sensor and the at least one processor may be further configured to calculate a first time of flight as the difference in time between the first transmission time and the first receipt time. In a variant, the at least one sensor and the at least one processor may be further configured to calculate a second time of flight as the difference in time between the second transmission time and the second receipt time. In a variant, the at least one sensor and the at least one processor may be further configured to perform one or more actions based on the first time of flight and the second time of flight. In a variant, the at least one sensor may be configured to monitor the at least one metric based on monitoring the fluid.

According to some embodiments of the present disclosure, a system may comprise one or more devices and one or more sensors to identify at least one metric for a fluid flowing through a line from a vessel to a dispenser. The system may identify a reference value for the at least one metric for the fluid. The system may perform an analysis of the fluid based on the at least one metric for the fluid. The system may compare the results of the analysis with the reference value. The system may perform at least one action based on determining that there has been a change in the at least one metric relative to the reference value.

In a variant, the one or more devices and the one or more sensors may run diagnostics to diagnose a potential problem with the line. In a variant, the one or more devices and the one or more sensors may provide consolidated information for correlation with point-of-sale data. In a variant, the one or more sensors may comprise at least one temperature sensor located inside of the line to monitor the temperature of the line. In a variant, the one or more devices may comprise at least one gateway that receives information from the at least one temperature sensor regarding the temperature of the line.

In a variant, the one or more devices and the one or more sensors may read the at least one temperature sensor. In a variant, the one or more devices and the one or more sensors may determine whether a temperature of the fluid is consistent with one or more dispensement specifications or a temperature anomaly is associated with producing a system notification. In a variant, the at least one metric may comprise at least one of barometric pressure within a cabinet, humidity within the cabinet, ambient temperature within the cabinet, and ambient gas concentrations within the cabinet.

In a variant, data representing the flow of the fluid through the line may be characterized by the at least one metric. In a variant, the one or more devices and the one or more sensors may perform one or more actions based on consolidated information or other information to modify the flow of the fluid. In a variant, the one or more sensors may comprise at least one sensor configured to monitor the color of the fluid flowing through the line. In a variant, the one or more devices may receive information from the at least one sensor regarding the color of the fluid flowing through the line.

According to some embodiments of the present disclosure, an apparatus may include at least one processor and at least one memory comprising computer program code. The at least one memory and computer program code may be configured, with the at least one processor, to cause the apparatus at least to perform one or more operations described herein.

According to some embodiments of the present disclosure, an apparatus may include circuitry configured to perform one or more operations described herein.

According to some embodiments of the present disclosure, an apparatus may include means for performing one or more operations described herein.

According to some embodiments of the present disclosure, a computer-readable medium comprises program instructions stored thereon for performing one or more operations described herein.

According to some embodiments of the present disclosure, a computer program product may encode instructions for performing one or more operations described herein.

In some embodiments, a beverage monitoring system for a beverage system is provided. The beverage system includes a pressurized gas source, pressurized gas regulators, pressurized gas distribution lines, beverage distribution lines, beverage vessels, and beverage dispensers. The beverage monitoring system comprises at least one gateway that includes a processor, a network interface connected to dispensers, and a network interface connected to sensor assemblies. The beverage monitoring system also includes a sensor assembly. The sensor assembly is configured to run diagnostics to diagnose a potential problem with the line, or provide consolidated information for correlation with point-of-sale data.

In some embodiments, a beverage monitoring system for a beverage system at least one gateway that includes a processor, a network interface connected to dispensers, and a network interface connected to sensor assemblies. The beverage monitoring system also includes a sensor assembly and a glycol cooling control and monitoring assembly. The glycol cooling control and monitoring assembly monitors a level of glycol solution within a glycol cooling system, monitors a flow rate of glycol within the glycol cooling system, monitors viscosity of the glycol solution, and/or measures a temperature delta of the glycol cooling system to determine draft beverage system effectiveness.

In some embodiments, a method for monitoring beverages in a beverage system including a pressurized gas source, pressurized gas regulators, pressurized gas distribution lines, beverage distribution lines, beverage vessels, and beverage dispensers is provided. The method comprises sensing characteristics of fluid within the beverage system, processing data generated based upon sensed characteristics of the fluid within the beverage system, and running diagnostics to diagnose a potential problems with the line or provide consolidated information for correlation with point-of-sale data.

Other features and advantages will be apparent to persons of ordinary skill in the art from the following detailed description and the accompanying drawings.

BRIEF DESCRIPTION OF DRAWINGS

Aspects of the present disclosure are illustrated by way of example and are not limited by the accompanying figures with like reference numbers indicating like elements.

FIG. 6 shows various types of beer as they are identified by color in accordance with the Standard Reference Method (SRM).

FIGS. 18A to 18H show an exemplary Daily Report.

DESCRIPTION OF THE PREFERRED EMBODIMENTS

Figure 1:
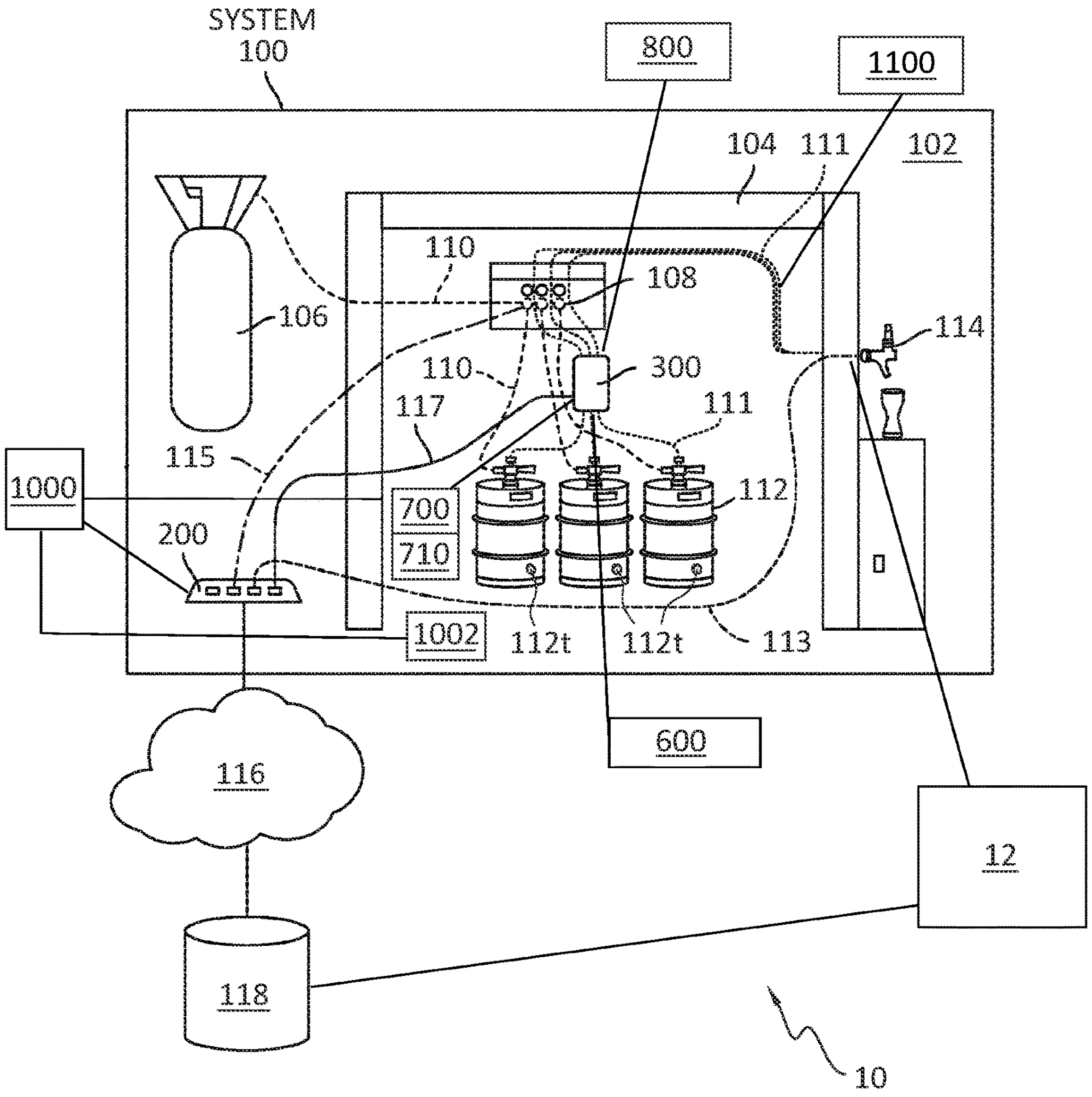
FIG. 1 depicts a diagram of an example beverage monitoring system according to some embodiments of the present disclosure.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, firmware, or in a combined software and hardware implementation that may all generally be referred to herein as a "circuit," "module," "component," or "system." Furthermore, aspects of the present disclosure may take the form of a computer program product embodied in one or more non-transitory computer-readable media having computer-readable program code embodied thereon.

Any combination of one or more non-transitory computer-readable media may be utilized. The non-transitory computer-readable media may be a computer-readable storage medium. A computer-readable storage medium may be, for example, but not limited to, an electronic, magnetic, optical, electromagnetic, or semiconductor system, apparatus, device, or any suitable combination of the foregoing. More specific examples (a non-exhaustive list) of the computer-readable storage medium may comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer-readable storage medium may be any non-transitory medium able to contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer-readable signal medium may be a computer-readable medium that is not a computer-readable storage medium and that is able to communicate, propagate, or transport a program for use by or in connection with an instruction execution system, apparatus, or device. Program code embodied on a computer-readable signal medium may be transmitted using any appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, and Groovy, or other programming languages. The program code may execute entirely on a single computing device, partly on one computing device (e.g., a local computing device) and partly on another computing device (e.g., on a remote computing device, such as a server in a data center or on a cloud computing device), or entirely on a remote computing device. In the case of multiple computing devices, the computing devices may be connected to each other through any type of network that includes wired and/or wireless connections, including a local area network ("LAN") or a wide area network ("WAN"), the Internet using an Internet Service Provider, an intranet, a mobile network (e.g., a 3G network, a 4G network, or a 5G network according to Third Generation Partnership Project (3GPP) specifications), and/or the like.

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of computing device, or other programmable data processing apparatus, such that the instructions, which execute via the processor of the computer device, cause the computing device to perform operations specified in the flowchart and/or block diagram blocks. A processor may control one or more devices and/or one or more sensors described herein.

These computer program instructions may also be stored in a non-transitory computer-readable medium that, when executed, may direct a computer, other programmable data processing apparatus, or other devices to function in a particular manner, such that the instructions, when stored in the non-transitory computer-readable medium, produce an article of manufacture comprising instructions which, when executed, cause a computer to implement the operations specified in the flowchart and/or block diagram blocks. The computer program instructions may also be loaded onto a computer, other programmable instruction execution apparatus, or other device to cause a series of operations to be performed on the computer, other programmable apparatuses, or other devices to produce a computer-implemented process, such that the instructions which execute on the computer or other programmable apparatus provide processes for implementing the operations specified in the flowchart and/or block diagram blocks.

Certain embodiments of the present disclosure may monitor the flow of a fluid to a dispensing unit, such as the pouring of a draft beer from a tap, in order to, for example, improve the dispensed quality of the dispensed fluid and reduce waste and/or spillage, to identify and reduce dispensement issues such as theft and waste by correlating flow data with point-of-sale data, and to collect data for analytics, which may improve efficiency and other business operating metrics. For example, a beer manufacturer may produce a beer with an intended amount of carbonation and foam. Certain embodiments described herein may use any of a variety of sensor technologies (e.g., optical, electromagnetic, ultrasonic) to characterize a beverage dispensement line and the flow within it (e.g., the presence and amount of air, carbon dioxide, nitrogen, or oxygen), the volume flow rate of that beverage in that beverage distribution line, the temperature of that beverage in that beverage distribution line, the cleanliness of that beverage distribution line, the presence of unwanted substances in that beverage distribution line (e.g., beer stones, yeast, mold, bacteria), degassing of the fluid, viscosity of the fluid, density of the fluid, a temperature of the fluid, and/or the like. Certain embodiments described herein may use this characterization along with other measurements collected from other sensors (e.g., measurements of ambient conditions, such as temperature, humidity, and/or pressure, from environmental sensors) to improve the dispensed quality of the beverage by providing feedback and alerts. Using this information, certain embodiments may identify quality problems with the pour of a beverage, including whether there is too much foam, and may determine possible underlying causes of the quality problems, such as the temperature in the cooler or the pressure in the beverage lines. In some embodiments, sensors, such as light sensors and/or optical sensors, may be configured to detect and/or identify particulate matter, such as dust, pollen, glass, dirt, metal shavings, and other impurities within the fluid. As an example, particulate matter may be detected and/or identified based upon the size of the particulate matter from readouts of the sensors. Additionally or alternatively, sensors may be calibrated to operate with a particular fluid. For example, sensors may be calibrated according to a predetermined color, carbonation level, viscosity, specific weight, specific volume, specific gravity, pH, and other fluid properties. In addition to fluid calibration, sensor functionality may be improved with calibration for particular environmental factors, such as the color of the line and/or brightness in a bar, since such environmental factors can affect sensor function with respect to, for example, monitoring color of the fluid.

In addition, certain embodiments may improve and maintain draft beverage system equilibrium by integrating with dispensement system components, such as gas regulation and mixing systems. Further, certain embodiments may correlate the sensor-monitored flow and environmental data with point-of-sale information to detect theft of beverage volume (e.g., a volume that was poured but not sold) and incorrect pouring techniques (e.g., waste), to evaluate business operations, such as which beverages yield the highest revenue or profit, or to determine quality in a particular context or timeframe. In this way, certain embodiments may improve business operations by identifying beverages whose sale could improve business operation metrics.

In the example context of a draft beverage system that dispenses beer, certain embodiments of the present disclosure may use ultrasonic transducers to measure the flow rate of beer as it travels from the keg to the tap. Using an ultrasonic transducer may avoid the drawbacks associated with traditional turbine flow meters and other more expensive or less accurate ways of measuring and monitoring flow rate. For example, the drawbacks of using turbine flow meters include their mechanical nature, e.g., moving parts that are subject to wear and failure, a need for periodic recalibration based on wear and change of mechanical characteristics, and a tendency to reduce the dissolved gas concentration of (i.e., degassing) the metered fluid. In addition, turbine flow meters designed for fluids are generally unsuitable for partially or completely empty lines and often yield incorrect readings and may be subject to damage in such cases. Electromagnetic flow measurement is relatively expensive and also utilizes more power than an ultrasonic sensor, which can be made to operate on merely a coin cell battery.

Certain embodiments described herein may include flow sensors through which the metered fluid flows. While non-intrusive measurement is possible, it is generally inferior because relevant engineering properties that affect measurement (e.g., material-dependent speed of sound or geometry-dependent cross-sectional area) typically vary over time and place, and impact the precision of the associated measurements. For example, the lines typically used for draft beverage distribution are flexible and would flex, compress, or otherwise deform if a typical non-intrusive clamp-on meter were to be used. A consistent, quality-controlled, and calibrated environment for such properties, provided by an ultrasonic sensor through which fluid flows, yields more precise measurements.

While certain embodiments may be described with reference to a draft beverage system (e.g., carbonated beer dispensed from a keg stored in a cooler via a tap), certain embodiments may be applicable to the dispensement or distribution of any carbonated or non-carbonated beverage or non-beverage fluid, such as nitro-pour coffee, carbonated soda, or water used for a manufacturing process, for which monitoring of temperature, pressure, flow rate, or other measurements discussed herein, may be performed. Certain embodiments described in the present disclosure are merely provided as example implementations of the embodiments described herein. Persons of ordinary skill in the art will readily appreciate that there are numerous possible embodiments beyond those described herein and that certain embodiments are applicable to various contexts beyond those provided as examples herein.

FIG. 1 depicts a diagram of an example beverage monitoring system 10 according to some embodiments of the present disclosure. For example, FIG. 1 depicts a beverage monitoring system 10, in the context of a larger beverage system 100, for monitoring equilibrium of and dispensement using a draft beverage system. In accordance with a disclosed embodiment, the system 100 includes an establishment location 102 (e.g., a bar or restaurant), an environmentally-controlled cabinet 104 (e.g., a cooler, a refrigerator) used to maintain the desired environmental characteristics of the dispensed beverages (e.g., temperature, pressure) contained therein and containing various distribution components, a pressurized gas source 106, pressurized gas regulators 108, pressurized gas distribution lines 110, beverage distribution lines 111, beverage vessels 112 (e.g., kegs, barrels, etc.), and beverage dispensers 114 (e.g., taps). The beverage monitoring system 10, which performs operations described herein, may include one or more components local to the system 100 or remote from the system 100. For example, the beverage monitoring system 10 includes a gateway 200 installed at the establishment location 102, and its data connections 113, 115, 117 with the beverage dispensers 114, point of sale systems 12, pressurized gas regulators 108, sensor assemblies 300, flow sensors 400 (see FIGS. 3A, 3B, 4A, 4B, and 4C), and environmental sensors 500 (see FIGS. 3A & 3B), respectively. In addition to the flow sensors 400 and environmental sensors 500, various other sensors, including, but not limited to pressure sensors 600, carbon dioxide sensors 700, and/or color sensors 800, may be integrated with the beverage monitoring system 10 to enhance the operation of the system 100. The gateway 200 is connected via a network 116 to off-site components 118 (e.g., server devices). Operations of the beverage monitoring system and/or devices or components thereof are described in more detail elsewhere herein. As will be appreciated based upon the following disclosure, the gateway 200, the sensor assemblies 300, flow sensors 400, environmental sensors 500 (including the carbon dioxide sensors 700), pressure sensors 600, and/or color sensors 800 work in conjunction to gather, process, and dispense information regarding the operation of the draft beverage system.

Figure 5:
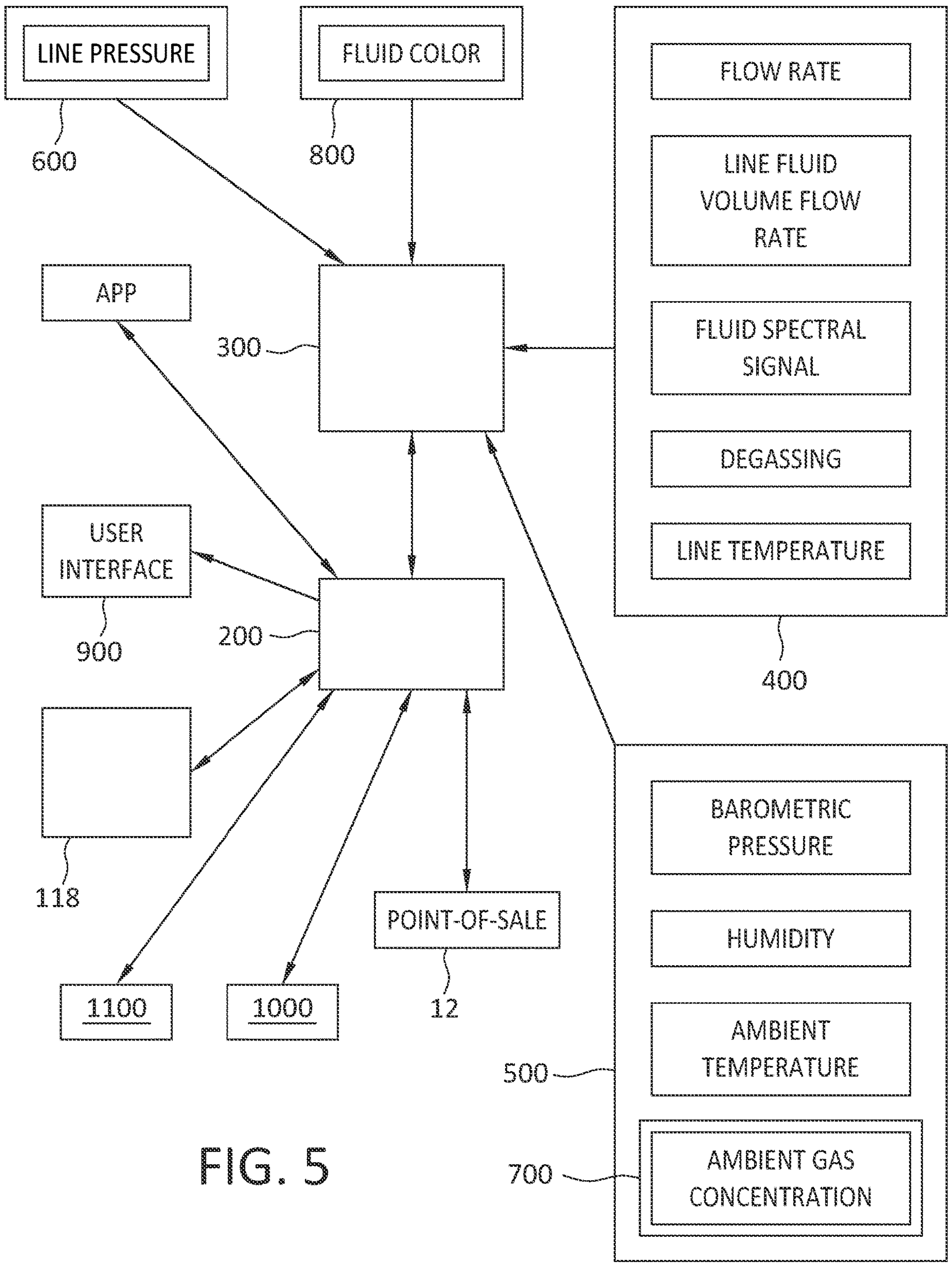
FIG. 5 is a schematic of the beverage monitoring system.

Referring to FIG. 5, the data include real-time readings relating to characteristics of the beverage flowing through the beverage distributions lines 111, including, but not limited to, the line temperature, the line pressure, the line fluid volume flow rate, the fluid color, the fluid spectral signature, the degassing of the fluid, and the flow rate of the fluid. The data also include environmental readings relating to the environment associated with the system 100, including, but not limited to, barometric pressure within the storage cabinet 104, humidity within the storage cabinet 104, ambient temperature within the storage cabinet 104, and ambient gas concentrations within the storage cabinet 104. The data further include sales information. As will be appreciated based upon the following disclosure, this data is processed by the gateway 200 and, optionally, off-site components 118 to generate information that is presented to beverage system operators via various interfaces 900 in a manner allowing the beverage system operators to optimize the operation of their system 100.

One of the core goals of the beverage monitoring system 10 is to eliminate unnecessary waste with a particular emphasis on mitigating any quality-related waste. Simply put, quality-related waste is one of the easiest forms of waste to deal with if beverage system operators are provided with the right tools for the job—those tools being the granularity of the data and real-time feedback that only the beverage monitoring system 10 is able to provide. Prior to the present beverage monitoring system 10 there was literally no way for beverage system operators to determine the frequency or scale of quality-related problems—at best they need to rely on bartenders to communicate any foaming issues to them, however, by the time a bartender says something it is often far too late. That bartender is likely to wait until it is literally unbearable and impeding their day-to-day operations before they say something to a manager. One of the primary ways that the present beverage monitoring system is differentiated from prior draft beverage systems is the approach on breaking down specifically where waste is occurring.

Many prior draft beverage systems simply indicate the % sold and % wasted and leave it at that whereas the present beverage monitoring system 10 takes things several steps further by providing an hourly breakdown of pours versus sales and isolating waste into 6 distinct categories: Human, Overpour, Underpour, Quality, Comp, and System (see FIGS. 18A to 18H). Human waste is loss that is from either improper Point of Sale (POS) usage or draft beverage system usage—this generally translates to mis-rings, unrung beers. Overpour and Underpour are inverse of each other and derived through a matching algorithm that is assigning discrete pours and sales together to determine the actual versus expected in terms of volume poured and volume sold. Quality waste is loss attributed to draft system equilibrium issues, particularly pertaining to pours that have temperature or pressure flags assigned to them.

The Comp category is where discounted or comped sales fall under—the beverage monitoring system 10 treats this as "waste" since the beverage system operator is dispensing product and not receiving the full revenue for it. Finally, the beverage monitoring system 10 considers loss that is typically associated with line cleanings and keg changes as being unpreventable.

Since the present beverage monitoring system 10 is monitoring the environmental conditions of every single pour, it is able to provide customers with a frequency distribution of when, where, and what issues they are encountering. Oftentimes temperature and pressure issues are intertwined with each other and lead to a common cause-and-effect scenario where a bartender might notice what they perceive to be a problem which leads to them adjusting pressure regulators and then compounding the problem. Draft beer science is relatively straightforward if you know what you're doing and have the ability to get real-time feedback, however, if you're blindly making adjustments the problem quickly balloons out of control. For example, if a keg unexpectedly kicks and the operator stores their kegs in the hallway or outside due to space constraints, the operator is now forced to throw a hot keg on-tap that will pour extremely foamy no matter what is done.

As shown below with reference to the various user interfaces 900 shown with reference to FIGS. 18A to 18H, the present beverage monitoring system 10 provides real-time keg levels so that beverage system operators may monitor when they are beginning to run low on a particular beverage and can move the replacement keg to the cooler to begin acclimating to the temperature. Beverage system operators also have the ability to reference the real-time temperature in the application for any of their beverage distribution lines 111 to determine if they are experiencing high temperatures, which tends to contribute directly to low-pressure scenarios since the two variables are intricately related. If a single beverage distribution line 111 or group of beverage distribution lines 111 are hotter than others, depending on several factors like whether you have a long-draw or direct-draw system, the operator can make inferences such as the keg is hot and needs time to acclimate, the beverage distribution line(s) 111 might be inadequately wrapped by insulation trunk, there is a hot-spot in the beverage distribution line 111, or the Glycol needs to be recharged/serviced.

The Daily, Weekly, and Monthly reports (see, for example, FIGS. 18A to 18H) provided in accordance with the present beverage monitoring system 10 all include a System Health section that breaks down the percentage of pours for each beverage distribution line 111 and classifies whether there were Low, Normal, or High conditions for temperature and pressure. Beverage system operators are able to configure their operating thresholds for temperature on a per-line basis and indicate whether they want stricter or more lenient thresholds for flagging pours with temperature issues. A more hands-on manager utilizing reports generated by the present beverage monitoring system 10 might analyze these reports every single day, and since reports generated by the beverage monitoring system 10 include line identifiers with each beverage, the manager can cross-reference beverages with high-quality waste against beverage distribution lines 111 that are having issues. Depending on what issues they observe in the Health Section of the reports for the beverage monitoring system 10, operators then have the ability to take action on those issues to attempt to mitigate the problem. Daily reports generated by the present beverage monitoring system 10 provide an hourly breakdown of pour data and include an overlay which indicates what percentage of the pours had underlying quality-related issues—allowing beverage system operators to identify whether the issue persisted throughout the day or over a brief period. When taking action steps, the present beverage monitoring system 10 encourages the beverage system operators to leverage these reports and then utilize the application of the present beverage monitoring system 10 when making adjustments to validate the conditions that their draft beverage system is operating under.

With the foregoing in mind, and considering the following detailed disclosures, the present beverage monitoring system 10 provides the tools and the data to allow beverage system operators to make informed business decisions. The reporting and consulting style of the present beverage monitoring system 10 is aimed at providing the beverage system operator with as much information as possible so that they can confidently navigate their issues. It is appreciated the present beverage monitoring system 10 may be integrated with additional sensors and control systems to automatically rectify issues such as cooler temperature or line pressure.

As explained above, FIG. 1 is provided as an example. Other examples are possible according to some embodiments.

Figure 2A:
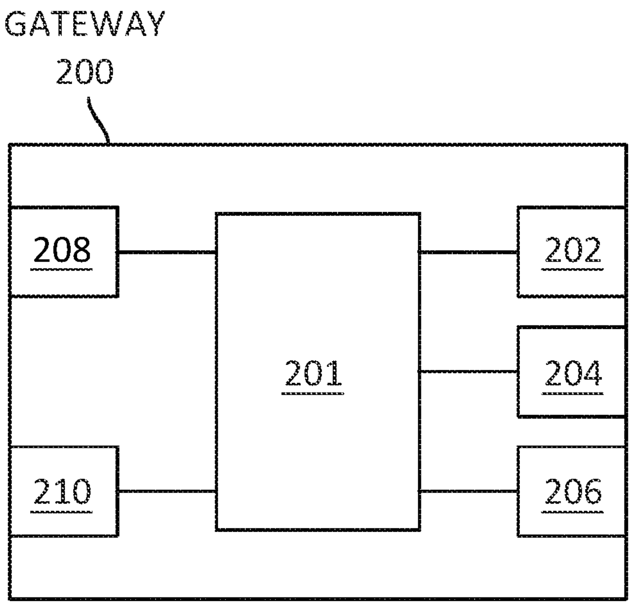
FIG. 2A depicts a functional diagram of an example local controller (gateway) according to some embodiments of the present disclosure.

FIG. 2A depicts a functional diagram of an example local controller, i.e., gateway 200 according to some embodiments of the present disclosure. For example, FIG. 2A depicts the gateway 200 of the beverage monitoring described with respect to FIG. 1. In some embodiments, the gateway 200 is used to monitor and collect environmental and flow metrics for a beverage during dispensement from taps, serve as a router between various devices, and serve as a gateway between the devices located on-site at the establishment location 102 and off-site, e.g., the off-site components 118. The gateway 200 is connected to a draft beverage system, where, for example, kegs of beer are stored in a cooler and poured from a tap after flowing through a line from the keg to the tap. The gateway 200 includes a processor 201, a network interface 202 connected via connection 113 to dispensers 114 (e.g., taps), a network interface 204 connected via connection 117 to sensor assemblies 300, an audio/visual control network interface 206 connected to disc jockey (DJ) or other audio/visual booths at the establishment location 102, an interface 208 for serial communication, and an Ethernet network interface 210.

The gateway network interfaces 202, 204, 206, and 210 are controlled and signaled separately to reduce packet latency. The gateway 200 serves as a router between the three network interfaces. The gateway 200 receives data from a sensor network via network interface 204 and processes that data to determine that a pour has started, and then sends that information to the tap network via network interface 202 so that the tap 114 can visually indicate the volume poured and, in certain embodiments, automatically close the tap 114 when a selected volume has been poured. The gateway 200 may also implement alternative communications interfaces such as cellular network modems to provide connectivity where wired Ethernet or wireless Ethernet (WiFi) is unavailable or otherwise undesirable.

The gateway 200 communicates with each tap via the tap network interface 202 and each tap 114 may be daisy chained together. The taps 114 may be powered externally. The gateway 200 knows which of the taps 114 was requesting a pour, and in turn, prioritizes the associated flow measurement packets so the tap 114 has real-time, low-latency data that may be used to control a valve within the tap. For example, if 3 out of 15 taps 114 are actively pouring beer, those traffic streams take priority over data (e.g., the gateway 200 may only bridge traffic from the sensor network to the tap network for the 3 active taps while caching other data for taps 114 that are not in use). This provides various advantages as data latency may create uncertainty or error as to how much beer has been poured. Reducing latency may result in a corresponding reduction in pour uncertainty or error. As an illustration of this, an increase in latency between collecting flow measurements and delivering those measurements to the tap 114 to control the valve of the tap 114 may result in an increased over pour of a beverage. As a result, the gateway 200 of certain embodiments may decrease waste, which may save costs that would otherwise be incurred as a result of overpouring.

Figure 2B:
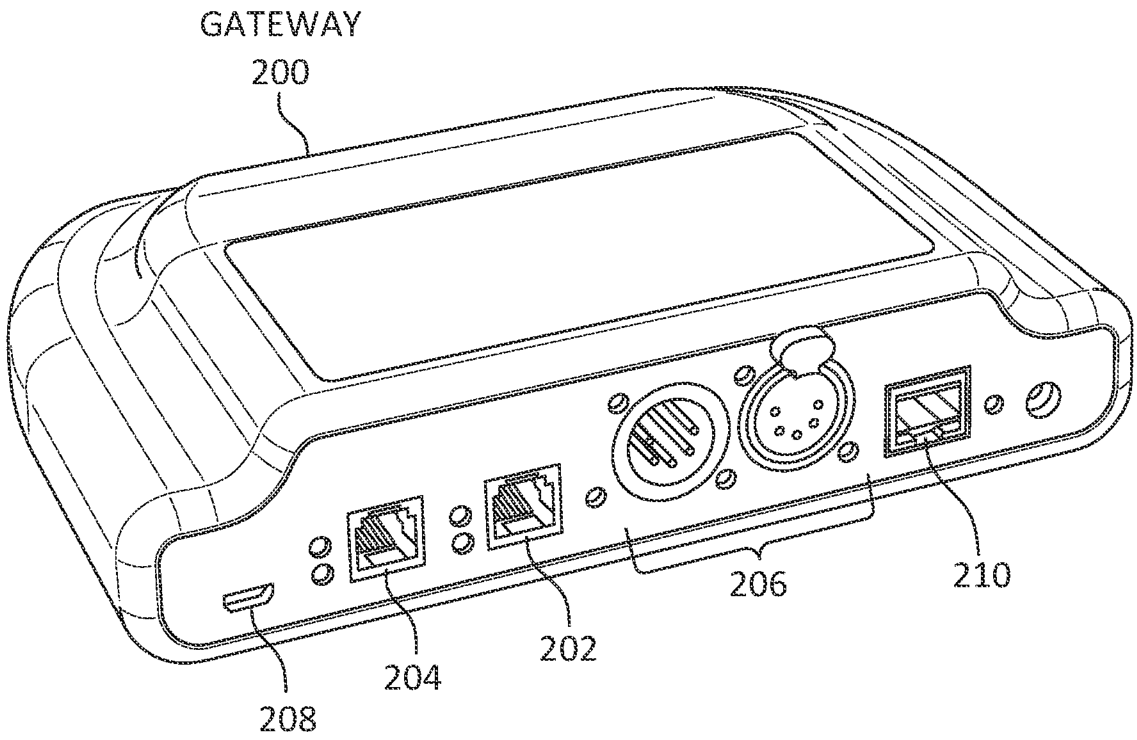
FIG. 2B depicts an external view of the example gateway of FIG. 2A according to some embodiments of the present disclosure.

The audio/visual network interface 206 is used to synchronize lighting control systems to the draft beer taps 114 or coordinate other special effects or audio/visual effects. For example, the gateway 200 may provide data to cause lighting arrangements to be activated and/or music to be played when certain taps 114 are in use. Additionally, or alternatively, this network interface may be used to activate light or sound alarms when certain issues are detected by the beverage monitoring system 10, as described elsewhere herein. FIG. 2B depicts an external view of the example gateway 200 of FIG. 2A according to some embodiments of the present disclosure.

As explained above, FIGS. 2A and 2B are provided merely as examples. Other examples are possible according to some embodiments.

Figure 3A:
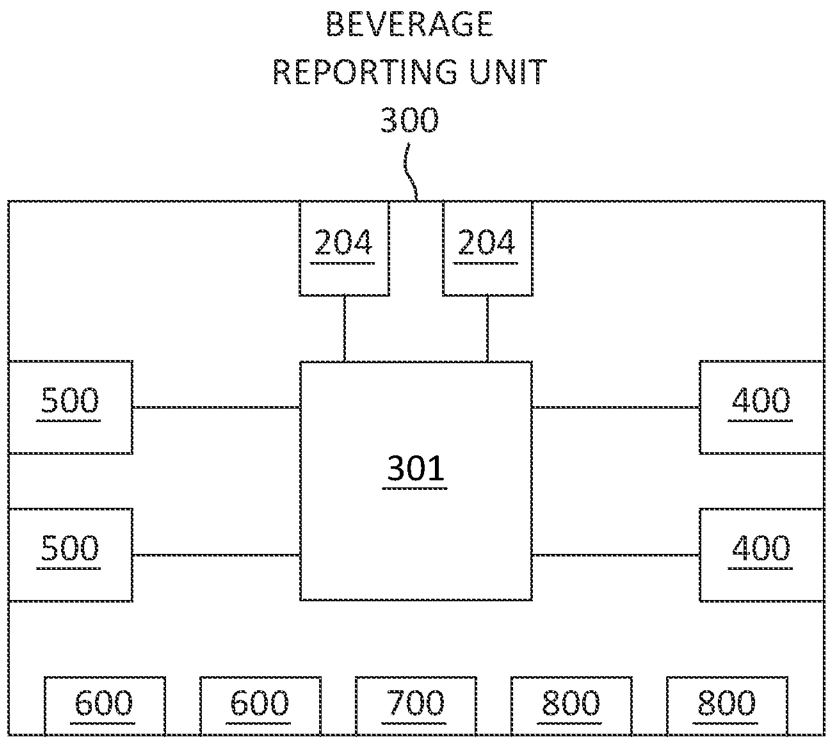
FIG. 3A depicts a functional diagram of an example sensor assembly (e.g., a beverage reporting unit (BRU)) according to some embodiments of the present disclosure.

FIG. 3A depicts a functional diagram of an example sensor assembly (e.g., a beverage reporting unit (BRU)) according to some embodiments of the present disclosure. For example, FIG. 3A depicts a diagram of a sensor assembly 300 of the beverage monitoring system 10. The sensor assembly 300 may house sensors and may provide locally collected data to the gateway 200 for further processing. The sensor assembly 300 includes a processor 301, sensor network interfaces 204 (e.g., one for connecting upstream towards the gateway 200, and one for connecting downstream towards the next daisy-chained sensor assembly 300, if present), one or more flow sensors 400, one or more environmental sensors 500, one or more pressure sensors 600, and/or one or more color sensors 800. Briefly, and as will be discussed in more detail below, the flow sensors 400 provide data relating to pressure, temperature, and fluid flow within the beverage distribution lines 111. The environmental sensors 500 provide data relating to the environmental conditions within the cooler in which the beverage is stored, including, but not limited to, barometric pressure, humidity, ambient temperature, as well as oxygen, nitrogen, carbon dioxide, or other ambient gas concentrations. The pressure sensors 600 provide direct real-time measurements of pressure within the beverage distribution lines 111, and/or color sensors 800 provide optical information regarding color characteristics of the beverage from which operational information may be ascertained. The collected data is applied to provide operators with critical insights regarding the operation of their beverage system.

The embodiment disclosed with reference to FIG. 3A depicts two flow sensors 400, two environmental sensors 500, two pressure sensors 600, one carbon dioxide sensor 700, and two color sensors 800, but any suitable number of sensors may be used depending on the number of beverage distribution lines 111 to be measured. For example, a bar may have 8 taps (with 8 beverage distribution lines). In the disclosed embodiment, the sensor assembly 300 includes 8 flow sensors 400, 8 pressure sensors 600, and 8 color sensors

Figure 3B:
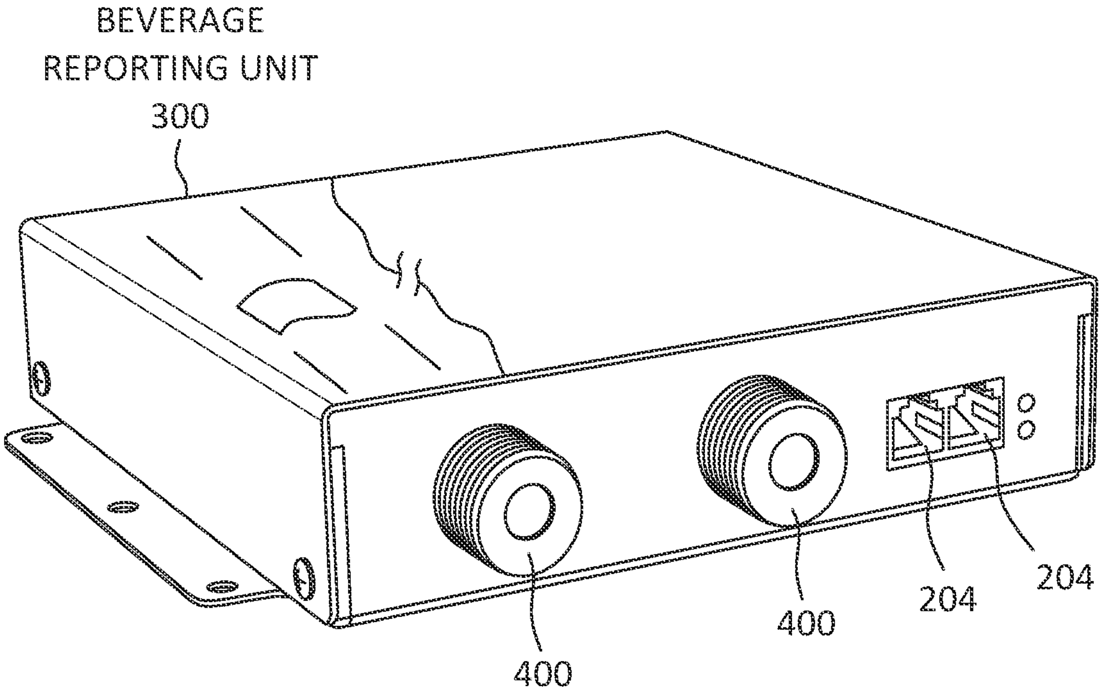
FIG. 3B depicts an external view of the example sensor assembly of FIG. 3A according to some embodiments of the present disclosure.

800. To accommodate additional flow sensors 400, pressure sensors 600, and color sensors 800, the sensor assembly 300 may be connected to one or more other sensor assemblies 300 via the appropriate sensor network interface 204 (e.g., upstream or downstream). The number of flow sensors 400, pressure sensors 600, and color sensors 800 corresponds to the number of fluid beverage distribution lines 111 to be distinctly measured, which typically corresponds to the number of taps or dispensing units but may involve more complicated configurations with line splitters. Certain embodiments include one flow sensor 400, one pressure sensor 600, and one color sensor 800 per tap or dispensing unit. FIG. 3B depicts an external view of the example sensor assembly of FIG. 3A according to some embodiments of the present disclosure.

As explained above, FIGS. 3A and 3B are provided merely as examples. Other examples are possible according to some embodiments.

Figure 4A:
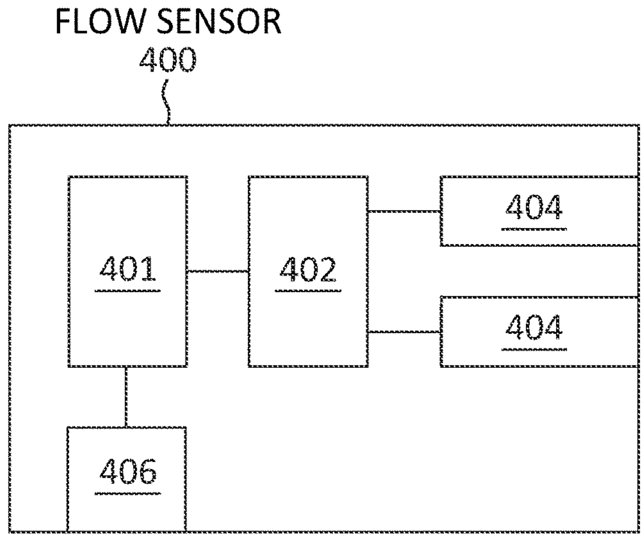
FIG. 4A depicts a functional diagram of an example flow sensor according to some embodiments of the present disclosure.

FIG. 4A depicts a functional diagram of an example flow sensor 400 according to some embodiments of the present disclosure. For example, FIG. 4A depicts a diagram of a flow sensor 400. The flow sensor 400 includes a processor 401, an ultrasonic front-end processor 402, two ultrasonic transducers 404, and a temperature sensor 406. The ultrasonic front-end processor 402 communicates with processor 401 via a flow pulse interface, or in accordance with alternative embodiments, via serial data communication, and/or pulse width modulation (PWM) or any combination of these methods. PWM of flow rate can potentially send flow data with higher resolution than a simple pulse flow interface and with lower latency. A serial data interface can potentially send flow and other measurement data much faster than a simple pulse flow or PWM interface and with lower latency than either.

As described below in more detail, in an example embodiment, flow sensor 400 includes two ultrasonic transducers 404 and uses a time of flight mechanism to measure the flow rate of the beverage being dispensed. The ultrasonic front-end processor 402 causes an ultrasonic signal to be sent through the fluid 420, which travels through a channel 450, at a known nominal speed along a signal path of known length 440 in one direction, from one ultrasonic transducer 404 to the other ultrasonic transducer 404, and then to be sent back again in the opposite direction. The difference between the signal travel time in each direction may be directly correlated to fluid flow speed because the measured speed of that signal is increased or decreased from its nominal speed by that flow speed, as that signal travels with or against the flow, respectively. In accordance with a disclosed embodiment, working together the sensor 400 and the gateway 200 detect the flow rate and time differential between the leading and trailing edges of the flow, and this information is transmitted to the off-site components 118 where the volume is calculated. It is, however, appreciated the sensing and calculations may take place in other parts of the system. Certain example embodiments may incorporate a correction for the effect of different temperatures, different alcohol concentrations, or different compositions (as characterized by spectral signatures) on the nominal speed of sound in the fluid.

In particular, the calculation of flow speed is performed in the following manner. The ultrasonic front-end processor 402 causes an ultrasonic signal to be sent, at a known nominal speed along a signal path of known length 440, from a first ultrasonic transducer 404*a* to a second ultrasonic transducer 404*b* through the fluid 420 traveling through a channel 450. The ultrasonic front-end processor 402 causes a signal to be sent, at a known nominal speed along a signal path of known length 440, from the second ultrasonic transducer 404*b* to the first ultrasonic transducer 404*a* through the fluid 420 traveling through the channel 450. The difference between the signal travel time in each direction is directly correlated to an initial determination of fluid flow speed because the measured speed of that signal is increased or decreased from its nominal speed by that flow speed, as that signal travels with or against the flow, respectively.

The initial determination of fluid flow is then adjusted based upon sensed and known characteristics of the fluid, such as, temperatures, different alcohol concentrations, or different compositions (as characterized by spectral signatures), to arrive at a sensed fluid flow speed.

Figure 4B:
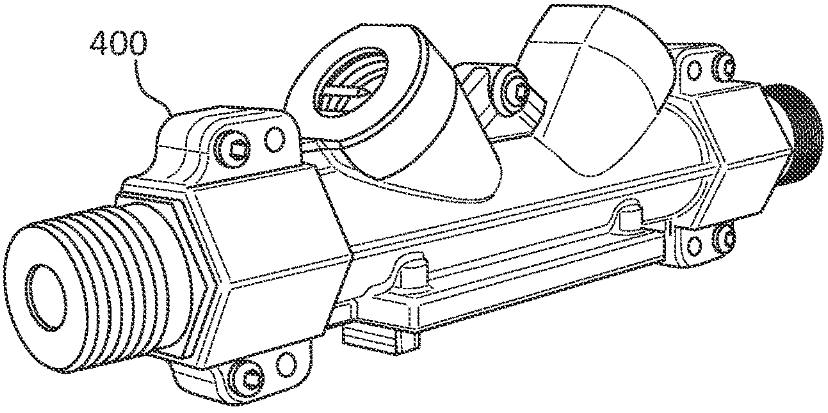
FIG. 4B illustrates an external view of the example flow sensor of FIG. 4A according to some embodiments of the present disclosure.
Figure 4C:
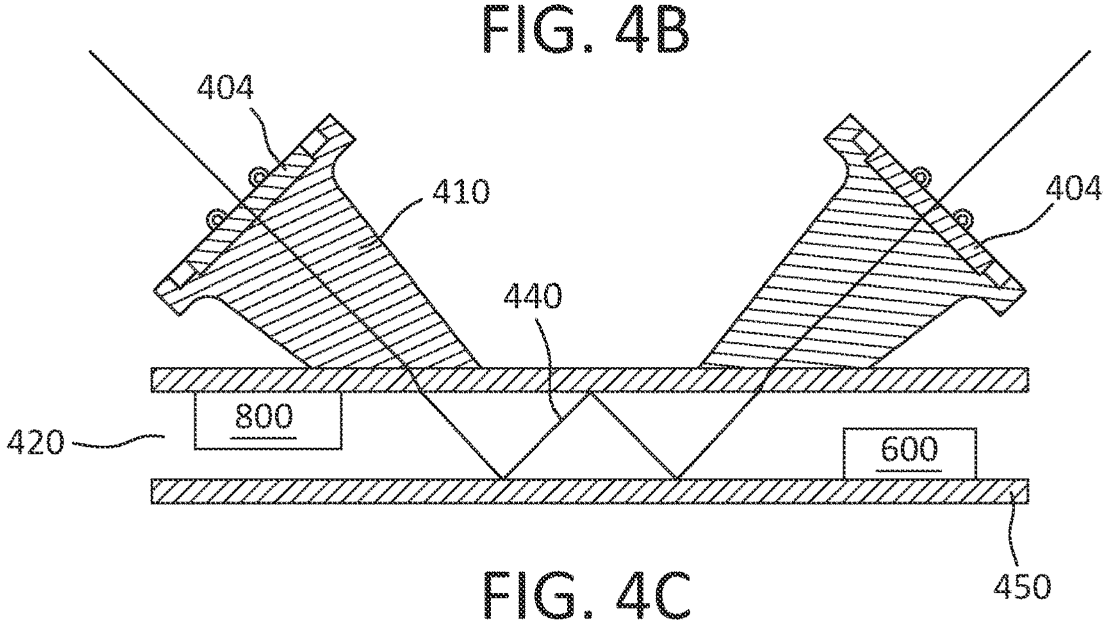
FIG. 4C illustrates a cutaway view of the example flow sensor of FIG. 4B according to some embodiments of the present disclosure.

FIG. 4B illustrates an external view of the example flow sensor 400 of FIG. 4A according to some embodiments of the present disclosure. FIG. 4C illustrates a cutaway view of the example flow sensor 400 of FIG. 4B according to some embodiments of the present disclosure, to highlight the ultrasonic signal path. As illustrated in FIG. 4C, the first ultrasonic transducer 404 and the second ultrasonic transducer 404 are arranged relative to each other to establish a signal path between them through the monitored fluid, considering the material properties the components traversed by the signal path (i.e., transducer mounts 410, fluid flow channel 450 wall, and monitored fluid 420), and the first ultrasonic transducer 404 and the second ultrasonic transducer 404 may be piezo transducers operating in a range from 100 kHz to 5 MHz. In certain embodiments, the sensor may be placed inside the tap or dispensing unit itself.

The ultrasonic transducers 404 of the present disclosure, in addition to providing information regarding measured flow rate as discussed above, also provide baseline signal quality metrics under normal operating conditions. For example, if the channel 450 is full or substantially full of beer or other fluid 420, the transducer provides a baseline signal strength. When that signal strength decreases, such a decrease can be used to determine the amount of air or other gases in the beverage distribution lines 111.

By way of example, the baseline signal quality metrics are applied in a rule-based evaluation system that runs each time a pour (a collection of samples and population statistics) or heartbeat (a single sample) is received. For the purposes of this disclosure, the evaluation system is described with respect to each time a pour is received.

Each time a pour is received, the following process is followed:

(1) the type (i.e., pour or heartbeat) and ID (identification) of the event is sent into a queue for asynchronous processing (so as to prevent longer-running rules from delaying processing);

(2) the message queued in Step 1 is received, and several data items are retrieved:

the window: this pour along with some number (0 or more) of the most recent for this sensor; and the variables: specific numerical values, e.g., number of samples, average sample volume, standard deviation of sample signal strength, z score of this pour's mean sample volume compared with that of those in the defined window;

(3) the data from Step 2 is evaluated based on the saved rule; and (4) the outcome from Step 3, either true or false, is used to initiate actions based on the saved rule (e.g., set a pour condition, archive a pour).

For example, where the standard deviation of sample signal strength is between 50 and 75, the "low pressure"

condition exists and is set on the pour. This condition is then used in downstream analyses when characterizing waste.

The determination baseline signal quality metrics are used to initiate notice to bar personnel that the draft beverage system may have become unbalanced, the attached keg may be empty, or there may be a leak in the beverage distribution lines 111 or other issue with the supply gases. For example, the beverage monitoring system 10 may perform this determination and may output a notification to a point-of-sale system or another computing device, may trigger an alarm or activate a light, and/or the like. Based on other sensor data points, the beverage monitoring system 10 may determine the origin of the unbalanced condition. For example, if the detected temperature and flow rate are to specifications (that is, as desired) and detected ambient pressure in the cabinet 104 is low, then the draft beverage system pressurization may have to be increased. For another example, if the detected temperature is higher than specification, then the environmental control (e.g., thermostat) may have to be used to reduce the temperature and the draft beverage system pressurization may have to be decreased until the temperature reaches specification. The present disclosure also distinguishes between a decrease in signal strength or quality (e.g., indicating air bubbles) and complete loss of signal or degradation of a signal below a predetermined threshold (e.g., indicating that a beverage distribution lines 111 is empty). In some embodiments, the beverage monitoring system 10 determines when a vessel, such as a keg, is empty. For example, the beverage monitoring system 10 determines that a keg is empty by detecting a threshold amount of gas in the beverage distribution line 111, the size of the keg, and/or the like.

In conjunction with an identification that a keg is empty, the beer line may be provided with a solenoid adjacent to the keg that is immediately closed. This eliminates the need for currently used ball valves, which, when a keg is emptied, require that the beer line be purged before another keg may be attached and the flow of beer resumed.

In various embodiments, the beverage monitoring system 10 determines when a beverage distribution line 111 is being cleaned. For example, the beverage monitoring system 10 determines that a beverage distribution line 111 is being cleaned based on particular flow patterns and/or compositions of fluid in the beverage distribution line 111. Furthermore, in certain embodiments, the beverage monitoring system 10 monitors vessel and/or bottle filling at a supply location. According to several embodiments, the beverage monitoring system 10 doses a fluid with one or more chemicals to achieve a particular concentration of chemicals in the fluid.

In certain embodiments, the temperature sensor 406 is a semiconductor temperature sensor, thermocouple, a non-contact infrared sensor, or a similar device fixed to the inside or the outside of the sensor pipe using glue or any other suitable attachment mechanism. The data monitored by the temperature sensor 406 may be collected at the same time as the flow data from the flow sensor 400, and may be collected first by the sensor assembly 300 and then forwarded to the gateway 200. Those data may be then reported to off-site components 118 for storage and further analysis.

Additionally, and as discussed herein in greater detail, the flow sensor 400 may incorporate other sensing mechanisms, for example, pressure sensors 600 and color sensors 800. The flow sensor may further include any combination of an illumination source, a light sensor, multi-channel spectral sensor, and/or laser to monitor various aspects of the beverage color and/or beverage spectral signature or even to identify air or other gases passing through the beverage distribution lines 111. For example, the illumination source may illuminate the beverage as it is flowing through a beverage distribution line 111, and a light sensor, multi-channel spectral sensor, laser, and/or the like may be used to determine changes in the flowing beverage (e.g., a keg change), line cleanliness compared with a baseline, the presence of beer stones, the gases present, and/or the like. In another embodiment active and/or passive spectroscopy techniques are applied using these same sensors to further analyze the characteristics of the beverage passing through the sensor. For example, flow sensor 400 may utilize spectroscopy techniques to analyze for contaminants in the beverage or to assess the composition of the beverage. In other embodiments, acoustic sensors gather additional properties of the fluid, e.g., density, and perform additional analyses such as the derivation of alcohol percentage. In other embodiments, it is possible to characterize the fluid passing through the sensor using spectral analysis techniques (based on comparison to or inference from pre-measured known spectral signatures of other fluids) to automatically tune certain calibration parameters to the specific fluid being dispensed. It is also possible to alert that the actual contents of a keg may differ from the expected contents of the keg (e.g., tapping a stout beer when the system expects a lager).

The sensor assembly 300 also includes one or more environmental sensors 500. The environmental sensors 500 measure and monitor cooler barometric pressure, humidity, and/or ambient temperature, as well as oxygen, nitrogen, carbon dioxide, and/or other ambient gas concentrations within the cooler (e.g., to promote employee safety and prevent asphyxiation in the event of a major gas leak). For example, the environmental sensors promote employee safety in various ways (e.g., by triggering an alarm in the cooler, actuating a motor to open a vent in the cooler, or by triggering a fan to turn on) based on a detected ambient gas concentration. Based on barometric pressure, the beverage monitoring system 10 calculates the gas pressurization adjustments necessary to properly balance the draft beverage system and maintain the desired amount of dissolved gases in the beverage, determines an amount of adjustment in one or more mechanical components needed to cause the gas pressurization adjustments, and triggers actuation of one or more mechanical components to cause the gas pressurization adjustments (e.g., by sending an instruction to the one or more mechanical components). In certain embodiments, a gas regulator 108 is connected via connection 115 to the gateway 200 via the control network interface (not shown with respect to the gateway 200) and is capable of remote operation. For example, this allows adjustment of the gas pressure on beverage distribution lines 111 remotely, without a need for a technician to physically adjust the gas pressure, thereby improving beverage dispensing performance and quality.

As discussed above, the beverage monitoring system 10 may include pressure sensor(s) 600, carbon dioxide sensor (s) 700, and/or color sensor(s) 800. These sensors are discussed below in greater detail.

In accordance with a disclosed embodiment, the pressure sensor(s) 600 is a commonly available pressure transducer that is integrated into the beverage distribution lines 111. In accordance with a disclosed embodiment, the pressure transducer 600 is integrated into the flow sensor 400, although it is appreciated pressure transducers 600 could be positioned at various locations beverage monitoring system 10. The integration of the pressure transducer 600 enables the measurement of real-time data pertaining to force applied to a specific surface (for example, in pounds per square inch (PSI) units) of an individual beverage distribution line 111. The ability to monitor the PSI helps assist customers in diagnosing and resolving pressure-related issues with the draft beverage system. Furthermore, the measurement of real-time data pertaining to the PSI of an individual beverage distribution line 111 is utilized in signal quality metric assessments.

The recommendation of specific actions being taken based upon measurement of real-time data pertaining to the PSI of an individual beverage distribution lines 111 depends on the type of gas system—whether it is strictly carbon dioxide versus mixed-gas. There are general recommendations for certain types of beer, however, there are several variables that go into draft beverage system equilibrium that prevent the establishment of a blanket answer of when an operator sees "X," set the pressure to "Y."

Carbon dioxide sensor(s) 700 and alarms 710 are also provided. It is appreciated carbon dioxide leaks result in financial losses and safety problems. The present beverage monitoring system 10 addresses these issues by integrating carbon dioxide sensor(s) 700 and alarms 710. The carbon dioxide sensor(s) 700 are commonly positioned in a cooler in which the kegs and carbon dioxide source are maintained. The addition of a carbon dioxide sensor 700 in either the BRU cabinet 104 or cooler(s) enables the beverage monitoring system 10 to alert beverage system operators when there are unsafe levels of the colorless, odorless, and tasteless carbon dioxide gas that can be fatal to individuals with prolonged exposure.

In accordance with a disclosed embodiment, multiple carbon dioxide sensors 700 are positioned within a cooler at cabinet level. The importance of having multiple carbon dioxide sensors 700 at the cabinet level is because there is no need for the entire cooler to be filled with carbon dioxide to suffer the ill effects of exposure. Unfortunately, there are virtually no regulations mandating the addition of carbon dioxide sensors and it is commonly ignored due to cost-savings. Not only are carbon dioxide leaks a hazard to the safety of employees and contractors who might enter the cooler—but they are also financially draining. If the entire carbon dioxide system is depleted due to a leak the beverage system operator will be required to order a replacement/refilling of the carbon dioxide canister, in addition, to the lost revenue during the period in which the beverage system operator is unable to serve any draft products.

The Occupational Safety and Health Administration (OSHA) has set exposure limits on gases in the workplace. With carbon dioxide, OSHA has set an exposure limit of 5,000 ppm over an eight-hour period, and 30,000 ppm over a 10-minute period. An increase of carbon dioxide to 30,000 ppm, can result in a person having deeper breathing, reduced hearing, headaches, increased blood pressure, and increased pulse rate.

Photometers and/or spectrophotometers may be used as color sensors 800 in accordance with a disclosed embodiment of the present beverage monitoring system 10. In accordance with a disclosed embodiment, the color sensors 800 is integrated into the flow sensor 400, although it is appreciated color sensors 800 could be positioned at various locations beverage monitoring system 10.

The addition of a color sensor(s) 800 provides additional insight into the optimal operation of the draft beverage system. For example, the information extracted from the color sensor(s) 800 allows for the determination of the specific beverage traveling through the beverage distribution lines 111. In accordance with a disclosed embodiment, this is achieved through the application of the Standard Reference Method (SRM). SRM is a standard method used by brewers use to specify beer color. In accordance with SRM, the attenuation of light of a particular wavelength (e.g., in the infrared range of 300 nm to 700 nm, in particular, 430 nm) is measured as the light passes through the beer. The measured attenuation may then be correlated with specific types of beer.

As shown in FIG. 6, each beer type has a specific color range, and this information, although not universally the same for all beer types within a specific classification, is highly useful in optimizing the operation of the present beverage monitoring system 10. In addition, to allowing the beverage system operator to confirm in real-time the specific beverage traveling through the beverage distribution line 111, the color sensor(s) 800 enable detection as to when changes in the specific beverage passing through the beverage distribution line 111 take place and/or when deviations in the specific beverage take place; indicating events such as a keg change or line cleaning.

The data extracted from the color sensor(s) 800 may also be combined with other sensors or data gathered by way of the present beverage monitoring system 10 to provide more robust handling tailored to specific beverages. For example, the beverage monitoring system 10 might detect that a beer was changed, and the beverage system operator input the new beer by brand, e.g., Bud Light, in the app of the beverage monitoring system 10. However, the color sensor 800 identifies the color of the new beer is something that is more in line with a stout. The beverage monitoring system 10 may then let the beverage system operator know the wrong beer might have been input into the app of beverage monitoring system 10 or that the wrong beer might have been connected to the beverage distribution line 111.

The beverage monitoring system is further enhanced by integrating certain features into the cooler. For example, the beverage monitoring system 10 includes a cooler control and monitoring assembly 1000 that specifically monitors the cooler fans, monitors humidity within the cooler, monitors barometric pressure within the cooler, etc. By providing a cooler control and monitoring assembly 1000 that specifically monitors the cooler fans, the present beverage monitoring system is able to maintain a service history, monitor ongoing system health, identify trends, and provide customer feedback on the general operation and performance of their cooler. Integration of the cooler control and monitoring assembly 1000 with the beverage monitoring system 10 provides for the ability to determine if a cooling cycle is deviating from the norm—potentially indicating an issue or abnormality in the draft beverage system.

As mentioned above, the cooler control and monitoring assembly 1000 also includes sensors 1002 for monitoring barometric pressure within the cooler. Measurements relating to barometric pressure on the BRU are applied to determine if there is deviation in the operation of the cooler. Measurements relating to barometric pressure on the BRU are also applied to alert beverage system operators if their cooler is non-operational, is overdue for regular maintenance, or needs maintenance to rectify an issue.

In addition to specifically monitoring a beer cooler, the cooler control and monitoring assembly 1000 is especially helpful in multi-use coolers where tracking of maintenance logs provides important insight. For example, by integrating the cooler control and monitoring assembly 1000 with the beverage monitoring system 10, beverage system operators are provided with alerts when a shared cooler (food product+ draft beverages) is operating outside of defined parameters; e.g., seafood must be kept below a certain temperature, or the humidity needs to be kept between certain bounds. By integrating the cooler control and monitoring assembly 1000 with the beverage monitoring system 10 beverage system operators are further provided with alerts when a cooler door is left open. With the foregoing in mind, the cooler control and monitoring assembly 1000 provides for the ability to alert beverage system operators if their cooler is non-operational, is overdue for regular maintenance, or needs maintenance to rectify an issue. By introducing the aforementioned insights into Daily/Weekly/Monthly reports a contextualization is provided as to when/why there are quality-related issues on reports.

Figure 7:
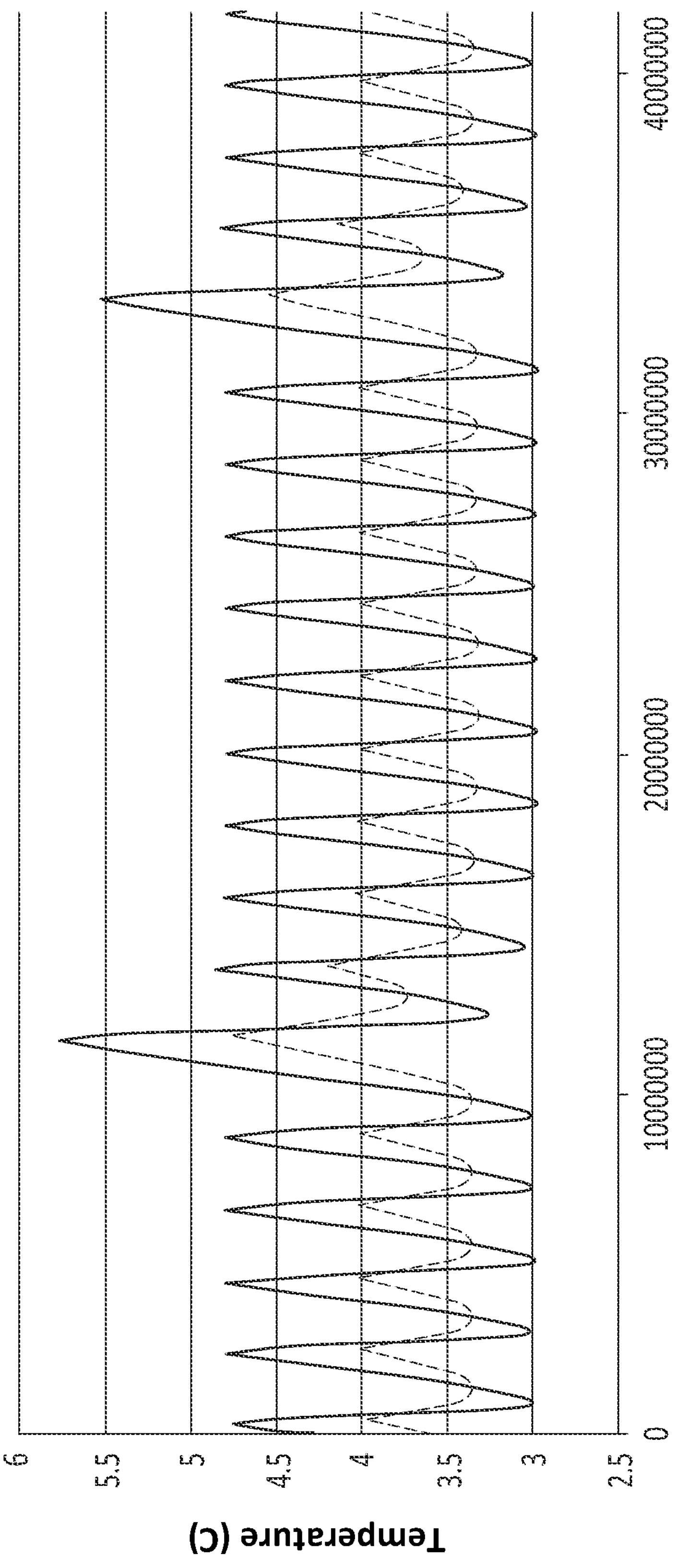
FIG. 7 depicts the relationship between the Cooler Temperature (-) and Line Temperature ( - - - ).

The graph shown in FIG. 7 depicts the relationship between the Cooler Temperature (-) and Line Temperature ( - - - ). The cyclical oscillation of the cooler fan engaging, bringing the temperature back down and repeating, should be noted.

The beverage monitoring system 10 also provides for monitoring glycol cooling systems commonly employed in long-draw beer systems. Similar to the integration of the beverage monitoring system 10 with the cooler control and monitoring assembly monitoring 1000 a cooler, a glycol cooling control and monitoring assembly 1100 is integrated with a glycol cooling system to ensure long-draw beer systems are operating under optimal conditions. The glycol cooling control and monitoring assembly 1100 specifically monitors the level of glycol solution within the glycol cooling system, monitors the flow rate of glycol within the glycol cooling system, monitors the viscosity of glycol solution, and/or measures the temperature delta of the glycol cooling system to determine draft beverage system effectiveness. These measurements are taken at various locations throughout the beverage system 100.

Additionally, it is well appreciated that glycol cooling systems need to be serviced regularly and the glycol cooling control and monitoring assembly 1100 tracks when the maintenance on various components, such as, but not limited to, the glycol level, condenser fins, airflow, and trunk line insulation.

By introducing the aforementioned insights generated by the glycol cooling control and monitoring assembly 1100 into Daily/Weekly/Monthly reports a contextualization is provided as to when/why there are quality-related issues on reports.

The beverage monitoring system 10 may further include an automated carbon dioxide regulator system providing a control mechanism that operates in conjunction with a pressure transducer. The integration of a carbon dioxide regulator system provides a valve or actuator that interacts directly with the pressure regulator, potentially allowing for draft beverage system adjustments to be made based on various metrics observed by the beverage monitoring system 10, such as, but not limited to flow rate, pressure, temperature, and signal quality. This carbon dioxide regulator system is further aware of when "events" occur, such as line cleanings and keg changes, so that it is not erroneously making adjustments that produce undesirable results.

In accordance with a disclosed embodiment, the information generated by the flow sensors 400, environmental sensors 500, pressure sensors 600, carbon dioxide sensors 700, and color sensors 800, as well as beverage dispensers 114, pressurized gas regulators 108, point of sale systems 12, the cooler control and monitoring assembly 1000, and the glycol cooling control and monitoring assembly 1100, are combined and processed to provide insights into the operation of the draft beverage system, and ultimately allow one to optimize operation.

As discussed above, the flow sensors 400 provide specific information regarding flow rate, fluid temperatures, signal quality metrics, changes in the flowing beverage (e.g., a keg change), line cleanliness compared with a baseline, the presence of beer stones, the gases present, fluid density, alcohol percentages etc. The environmental sensors 500 provide specific information regarding cooler barometric pressure, humidity, ambient temperature, as well as oxygen, nitrogen, carbon dioxide, or other ambient gas concentrations. The beverage dispensers 114 provide specific information regarding pours. The pressurized gas regulators 108 provide specific information regarding gas pressure within the system. The point-of-sale system 12 provides specific information regarding sales.

With this information in hand, the beverage monitoring system determines a wide range of operator parameters and whether the draft beverage system is operating properly. One of the biggest issues confronting beer dispensing is foamy beer and the waste associated therewith. The present beverage monitoring system 10 uses the information generated by the pressure sensors 600, carbon dioxide sensors 700, and color sensors 800, as well as beverage dispensers 114, pressurized gas regulators 108, point of sale systems 12, the cooler control and monitoring assembly 1000, and the glycol cooling control and monitoring assembly 1100, in conjunction with computer-based algorithms to combat this commercially dangerous problem.

By way of example, the environmental sensor 500 determines if there is condensation or abnormal moisture levels in the cooler (e.g., uncontrolled atmosphere is reaching the cooler through a hole in the cooler or an open door), or if there is a difference between the cooler temperature as measure by the environmental sensor 500 and the beer temperature as measured by the flow sensor 400 or the environmental sensor 500 (e.g., beer has not been cooled long enough to reach thermal equilibrium with cooler), which lead to pouring with too much foam, e.g., waste. For another example, the beverage monitoring system may know that a certain full keg holds enough beer to pour 60 pints, but upon accessing the point-of-sale system 12, the beverage monitoring system 10 may determine that there were only recorded sales of 50 pints of the beer by the time the keg is empty. With the data from the flow sensor 400, temperature sensor 406 (associated with the flow sensor 400), and environmental sensor 500, the beverage monitoring system 10 analyzes and determines whether the conditions were creating foamy beer and output this information to a computer (e.g., associated with a manager or bartender) to help prevent future waste. Additionally, or alternatively, the beverage monitoring system 10 monitors for the occurrence of similar conditions and triggers an alarm or output notification indicating that environmental conditions which previously led to waste are present again. In certain embodiments, the beverage monitoring system 10 determines a modification to flow rate, temperature, or an environmental factor that is needed to prevent the waste (e.g., an increase/decrease in temperature or humidity of a cooler or other room), and outputs this information or activates one or more flow dispensing devices or environmental control devices to adjust these measurements. For example, the beverage monitoring system 10 turns on/off an air-conditioning unit or a heater (otherwise adjust a thermostat), turns on/off a humidifier or de-humidifier, and/or the like.

Alternatively, if analysis of the data from the flow sensors 400, temperature sensors 406, and environmental sensors 500 determines that the conditions would not lead to foam or other waste, the beverage monitoring system 10 determines that someone is pouring beers without charging for them or is using incorrect pouring technique and may output this information to a computer (e.g., of a manager of a bar). In this way, certain embodiments facilitate detection and prevention of theft and waste.

Other examples of controls incorporated into sensors are possible. For example, a temperature sensor 406 that measures the temperature of the liquid in the beverage distribution line 111, may incorporate the ability to control the temperature of the cooler in which the fluid is flowing from or have another control mechanism to adjust the temperature of the liquid in the beverage distribution line 111. Including controllers in conjunction with one or more of the sensors may provide for an autonomously balanced draft beverage system based on system parameters (e.g., line length, line drop, beverage dispensed, other factors discussed in this specification), environmental or other conditions identified by the sensors (e.g., temperature changes, changes in weather patterns creating barometric pressure variations contributing to flow anomalies) that may detect abnormalities or other changes and may make adjustments to correct or improve the operating conditions of the draft beverage system automatically and autonomously.

In addition, other actions are possible by certain embodiments. For example, systems described herein may generate a report that includes information related to a result of analyzing data, which identifies a source of an issue of a flow of fluid, forecasts for fluid dispensement, compares net profits, and/or the like. For specific examples, the reports may identify per-keg efficiency or other per-keg metrics, an expected remaining life for a keg, that a particular keg and/or beverage distribution line 111 is experiencing a leak, and/or the like.

As described above, certain embodiments may use one sensor per beverage distribution line 111 (or other suitable fluid or beverage line). A bar or restaurant with a draft beverage system may have any number of taps depending on the needs of their business. Certain embodiments may include locating several flow sensors together in a sensor assembly 300, and then networking the sensor assemblies 300 together via the sensor network interfaces 204 to streamline the installation process and reduce costs. For example, a sensor assembly 300 may be installed into a first beverage cooler. The sensor assembly 300 may contain two flow sensors in an example embodiment, as shown in FIG. 3B. A second beverage cooler may contain another sensor assembly, and so forth for each of the beverage coolers at the establishment location 102. The sensor assemblies 300 may be daisy chained together via sensor network interfaces 204 to communicate with each other (or connected via any other suitable mechanism to allow communication). The last connection from the sensor assemblies 300 may connect to a gateway 200. This network of sensor assemblies 300 may use a networking protocol for sensor assembly 300 communications and data collection. This is designed for low latency communication to the gateway 200.

The gateway 200 may function as a protocol converter for sensor network data and may be connected via network 116 to off-site resources 118. The gateway 200 may query one or more of the sensor assemblies 300 ("pull"), or optionally one or more of the sensor assemblies 300 may report directly to the gateway 200 ("push"). The sensor assembly 300 may provide the data from its flow sensors and environmental sensors. The gateway 200 may then consolidate and process the data using algorithms to analyze the data, including to find the start and stop of flow (e.g., the start of flow may be determined when the flow exceeds a threshold flow rate and stop of flow may be determined when the flow is below the threshold flow rate). The gateway 200 may submit this data to off-site resources 118 for retention and further processing, including correlating the flow and environmental data with point-of-sale system data and characterizing the flow (e.g., as beverage dispensement, leakage, system cleaning) based on whether the flow satisfies pre-determined threshold flow rates, based on sensor data and other information (e.g., bar-provided business hours and scheduled/activated cleaning procedures). Thus, the flow of data contemplated by certain embodiments may involve the sensors monitoring and measuring the flow of the beer and associated environmental conditions as it flows to the tap to be poured. Those sensors may provide that data to the sensor assembly 300. The sensor assembly 300 may report that data to the gateway 200, and the gateway 200 may provide that data to off-site resources 118 via the network 116.

The gateway 200 may poll (e.g., periodically, according to a schedule, or in a continuous manner) the sensor network interface 204 to request data and may receive packets from the sensor assemblies 300 representing flow (e.g., flow in milliliters since the last packet) and environmental data. Using this data, the gateway 200 may perform processing to determine if a fluid flow is occurring (e.g., different types of flows, such as a pour, a leak, line cleaning, and/or the like may be identified based on whether the flow rate satisfies one or more pre-determined thresholds). The gateway 200 may constantly monitor the flow (e.g., in a streaming manner). The gateway 200 may run a derivative function over the flow rate. When the gateway 200 detects a sharp rise relative to some threshold (e.g., predetermined or dynamically determined threshold), it may start accumulating data until it detects the end of the pour. In this way, the accumulation of relevant data may be sent to off-site resources 118, e.g., cloud resources for storage and/or further analysis. The accumulated data may be stored in the gateway 200, in some embodiments.

In accordance with a disclosed embodiment, and considering the beverage monitoring system 10 includes a gateway 200 with data connections with the beverage dispensers 114, point of sale systems 12, and flow sensors 400, the beverage monitoring system 10 is able to match pours with sales to provide insight to efficient operation. It should, however, be appreciated that the gateway 200 only has a data connection with the flow sensors 400 and "the cloud" 116 and has no connection at all to the dispensers 114, i.e., "smart taps" (such things are generally not installed anyway); and POS integration is done downstream, i.e., "in the cloud", via a different channel with no knowledge by the gateway 200.

This is achieved using active, i.e., not archived, pours and sales, each with an associated beverage, volume, and timestamp. It should be appreciated that pour archival is a process by which pours are flagged for exclusion a) automatically based on numerical criteria, e.g., sample count below a threshold, sample flow volume standard deviation above a certain threshold, negative total volume, or b) manually based on out of band knowledge, e.g., sensor problem, special event. Sale archival is a process by which sales are manually flagged for exclusion based on out of band knowledge, e.g., sensor offline. In each case, archival is used to ensure that inaccurate data and data that is incorrectly unbalanced (as opposed to data that is correctly unbalanced, e.g., in the case of poor POS usage) is excluded and does not reduce the accuracy of related reports.

The procedure functions in the following manner.

Step 1. For a given integration job (i.e., a batch of POS data defined by a timestamp range and location), a time series of data is produced for each beverage and business day. The time series of data consists of commingled pours and sales, ordered by timestamp. For the purposes of "business day" the concept of "rotation" which refers to the number of hours "today" extends into "tomorrow" for the purposes of reporting, e.g., data through 2 AM tomorrow (i.e., a 2 hour "rotation") will be counted in the data for "today," is utilized.

Step 2. For each time series produced in Step 1, the pours and sales are related by: matching pour to sale (this accounts for 1:1 ratio for sale:pour)—for each sale match the closest (i.e., with respect to time and volume, with separate thresholds) unmatched pour (if present) (step 2.1); match pour to sales (this accounts for m:1 ratio for sales:pour, e.g., one 32 oz pour for two 16 oz sales)—within an order, aggregate sales into a single "sale" and repeat the process from Step 2.1 (respecting and matches already made) (step 2.2); match top-offs (this accounts for relatively small pours used to "complete" large pours)—for matched pours, match unmatched small pours occurring within a parameterized time and for the same line as the base matched pour (step 2.3).

Step 3. The match groups (graph theory "components") are extracted from related pours and sales in Step 2.

Step 4. The match groups from Step 3 are saved to the database for use in analysis (explained elsewhere).

It is contemplated the above procedure may be further optimized by considering 1:m ratio for sale:pours for handling incremental pours that are not top-offs (Step 2.3); relations between pours and sales that may have been mis-connected (pours) or mis-rung (sales); and applying machine learning to tune matching algorithm based on observed location-specific behavior with respect to pours and sales, e.g., tab closures (and sale timestamps) at shift end, 1:m and m:1 sale:pour practices.

Diagnostics can also be run on the data on the gateway 200 or on the off-site resource 118. For example, the beverage monitoring system 10 of certain embodiments may remotely diagnose potential problems (e.g., system overpressurization, cooler temperature anomalies) without the need for personnel at the enterprise location 102 to make a service call, e.g., the beverage monitoring system 10 may remotely diagnose that beer is being wasted due to a pressure system imbalance, that a cooler temperature is not being maintained, and/or the like. The gathered data is also used to monitor pricing, beer types, usage, trends, regional preferences, etc.

The beverage monitoring system 10 may also be used in monitoring the beverage vessels, for example, keg shells 112. In accordance with such an embodiment, each keg shell 112 is provided with a tracking device 112*t*, for example, similar to an air tag as sold by Apple. The air tags 112*t* are registered and monitored by the beverage monitoring system 10. By monitoring the keg shells 112 it is possible to enhance the cleaning process required for specific beers, optimize the transition of the keg shells 112 for use in conjunction with different types of beers and beverages, maintain a record of the contents of various keg shells 112.

With the wide variety of data sources and information generated based upon the components of the present beverage monitoring system 10, a robust user interface is provided offering end beverage system operators high-level overviews, as well as highly detailed views.

Figure 8:
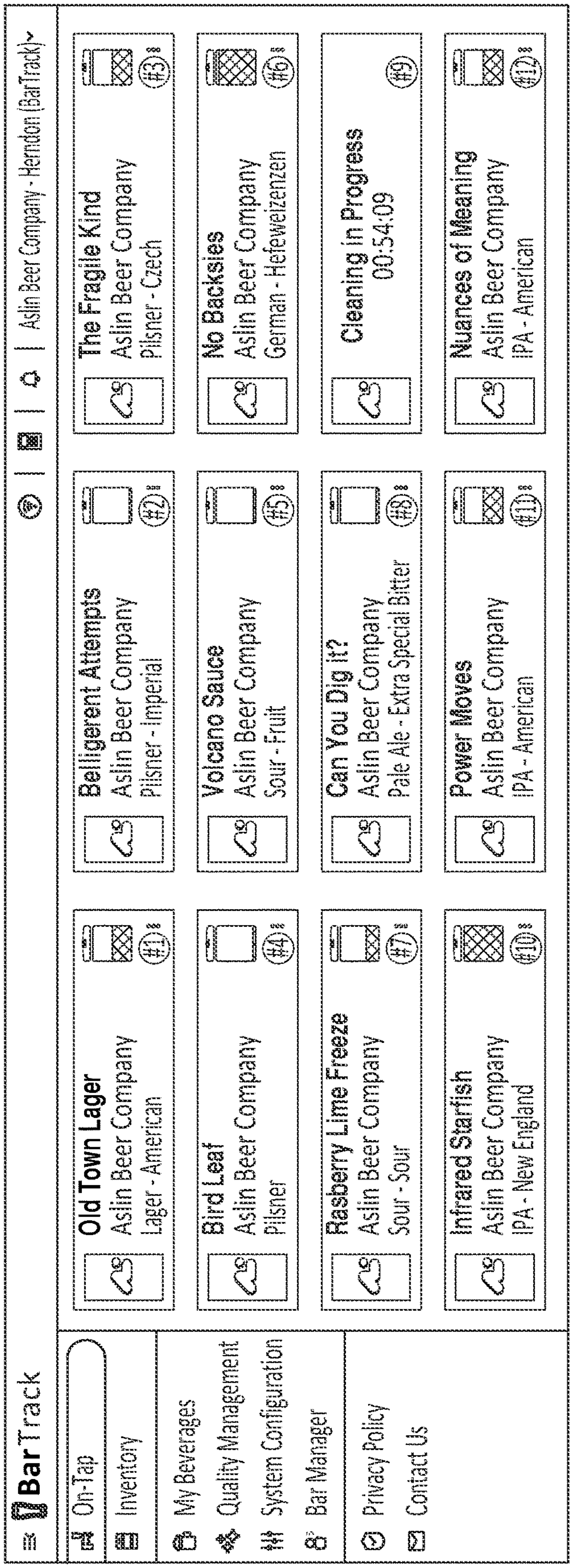
FIGS. 8 to 17 are various user interfaces employed with the beverage monitoring system.

For example, and with reference to FIG. 8, beverage system operators can visualize a high-level overview of the beverages currently connected to the draft beverage system—in addition to the volume remaining in each keg via the keg level icons. This allows beverage system operators to know when they need to consider moving new kegs into the cooler prior to a keg kicking so that they can begin the temperature acclimation process.

The key components of the interface disclosed with reference to FIG. 8 include:

- Organized by Line Identifier
  - Can be grouped by Cooler or Bar as well
- Beverage Name & associated characteristics (Type/Style/ABV/etc.)
  - Logos for easy brand identification
- Real-time Keg Levels
- Real-time Cleaning Indicator
  - Line #
  - Elapsed time
- Ability to perform "Quick Actions"
  - Change—Same
    - Replace the current keg w/identical size & beverage
      - If you do not have that keg in your inventory, the interface allows you to automatically add one and proceed with the keg change
  - Change—Different
    - Navigates the beverage system operator to the Change Keg screen to select the next keg
  - Change—Queued
    - Replace the current keg w/the next keg in the queue
  - Start Cleaning
    - Initiate a line cleaning on the selected line.

Figure 9:
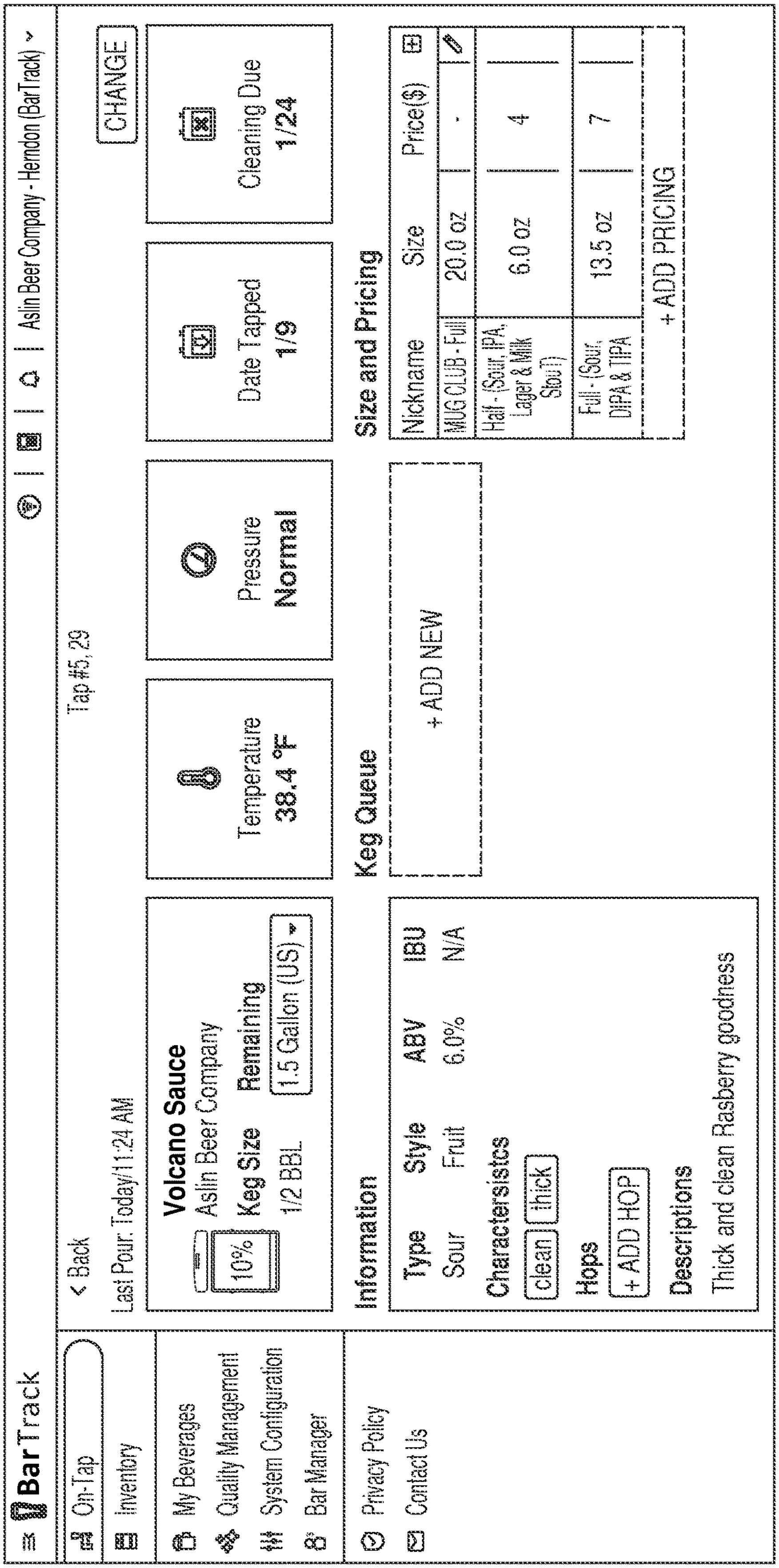

Referring to FIG. 9, beverage system operators can visualize more details about a particular keg that is connected to one of their lines. Beverage system operators are presented with information that can be used to perform diagnostics, in addition to performing managerial actions.

The key components of the interface disclosed with reference to FIG. 9 include:

- Real-time Data
  - Keg Level (%) & Volume Remaining (oz/gal)
  - Temperature
  - Pressure
  - Last Pour timestamp
- Keg & Line History
  - Date Tapped (keg)
  - Cleaning Due (line)
- Keg Queue
  - Management can allocate kegs from Inventory to a particular line to eliminate confusion for bar staff when switching kegs
- Beverage Information
  - Bar staff can reference this information to give customers recommendations or more insight into the beverage such as the Type, Style, ABV, IBU, or Characteristics.

Figure 10:
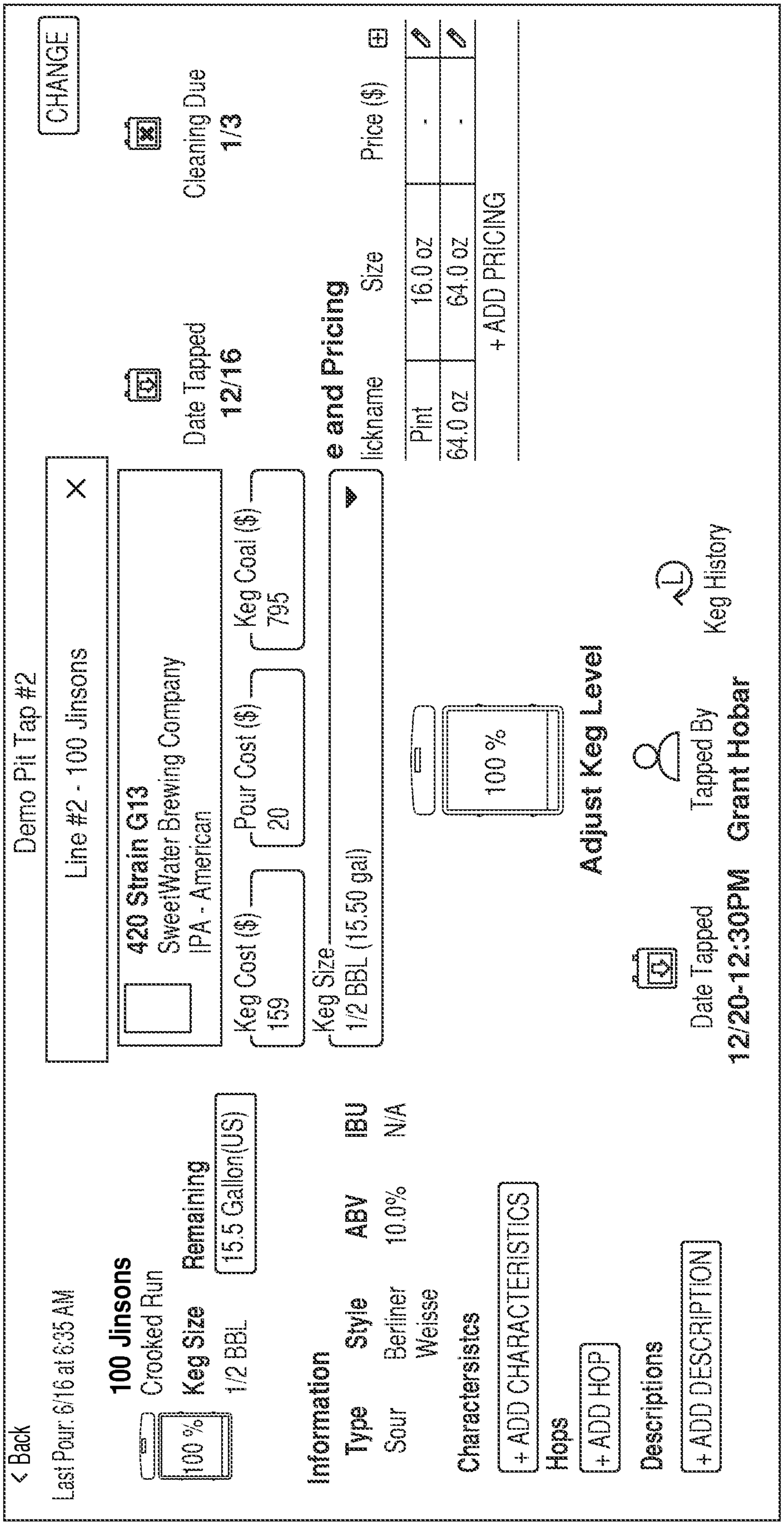

Referring to FIG. 10, managers have the ability to perform administrative actions within the Keg Details section—enabling them to modify various attributes of a keg or see the history of actions performed to a keg. Beverage system operators can visualize more details about a particular keg that is connected to one of their beverage distribution lines 111. Beverage system operators are presented with information that can be used to perform diagnostics, in addition to performing managerial actions.

The key components of the interface disclosed with reference to FIG. 10 include:

Adjust Pricing
- Keg Cost & Keg Goal directly impact the analytics, and this allows beverage system operators to easily verify the correct values are configured
  - If beverage system operators determine they need to make a modification, they have the ability to apply the changes to all kegs in their Inventory or set the new values as the new default for all kegs of that type moving forward Adjust Keg Size
- Employees occasionally make mistakes, and the keg size needs to be easily modified
  - (e.g., ½ BBL tapped instead of ⅙ BBL)

Adjust Keg Level

Keg History
- Date Tapped/Tapped By
- Date Added/Added By
- Keg Level adjustments/Modified By
- Pricing adjustments/Modified By.

Figure 11:
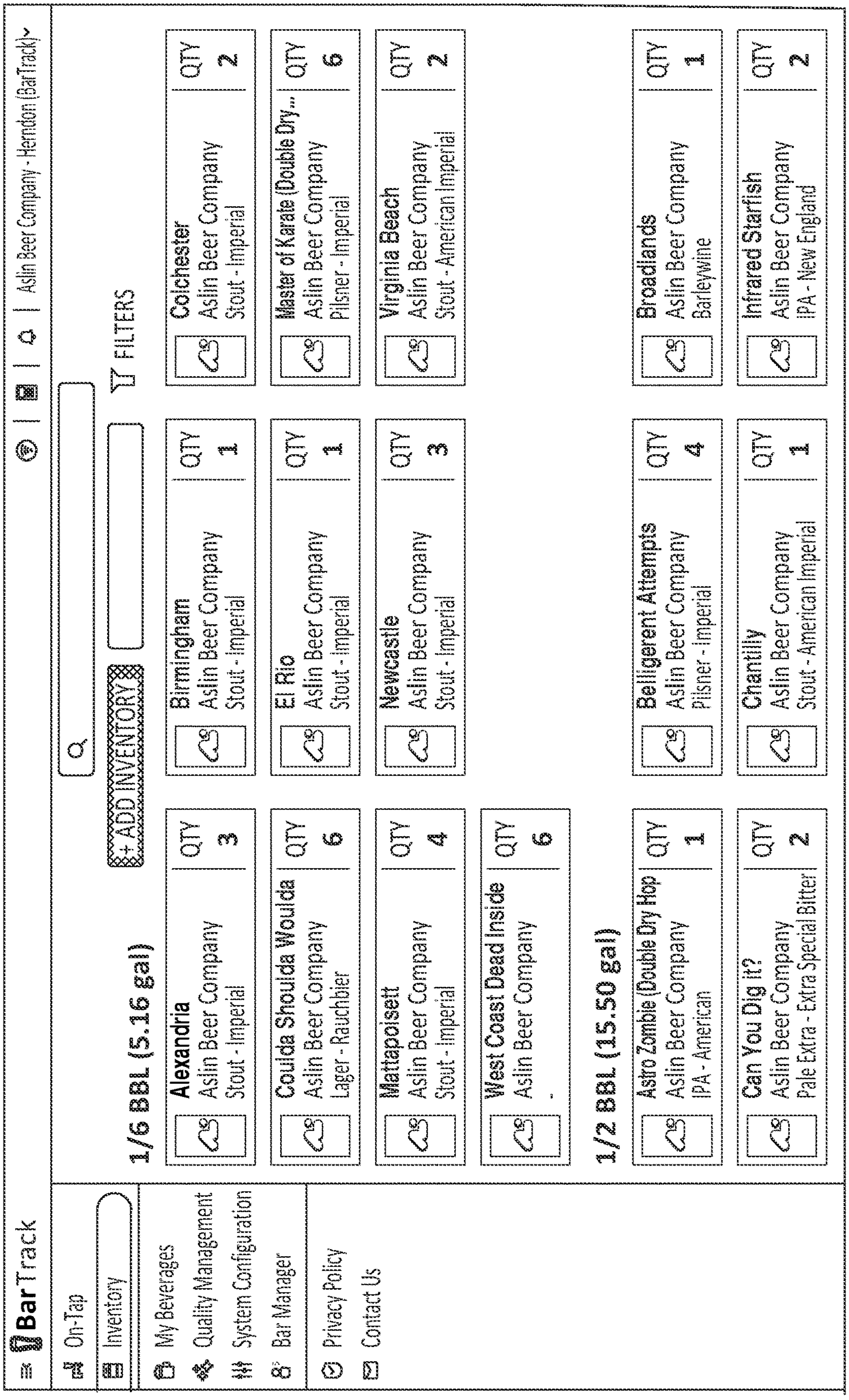

Referring to FIG. 11, beverage system operators can manage and visualize their on-hand inventory grouped by keg size. Beverage system operators are able to see at a high-level how many of each kind of keg they have left and easily add/remove inventory as it is consumed.

The key components of the interface disclosed with reference to FIG. 11 include:

Real-Time on-hand inventory

Ability to easily add/remove inventory.

Figure 12:
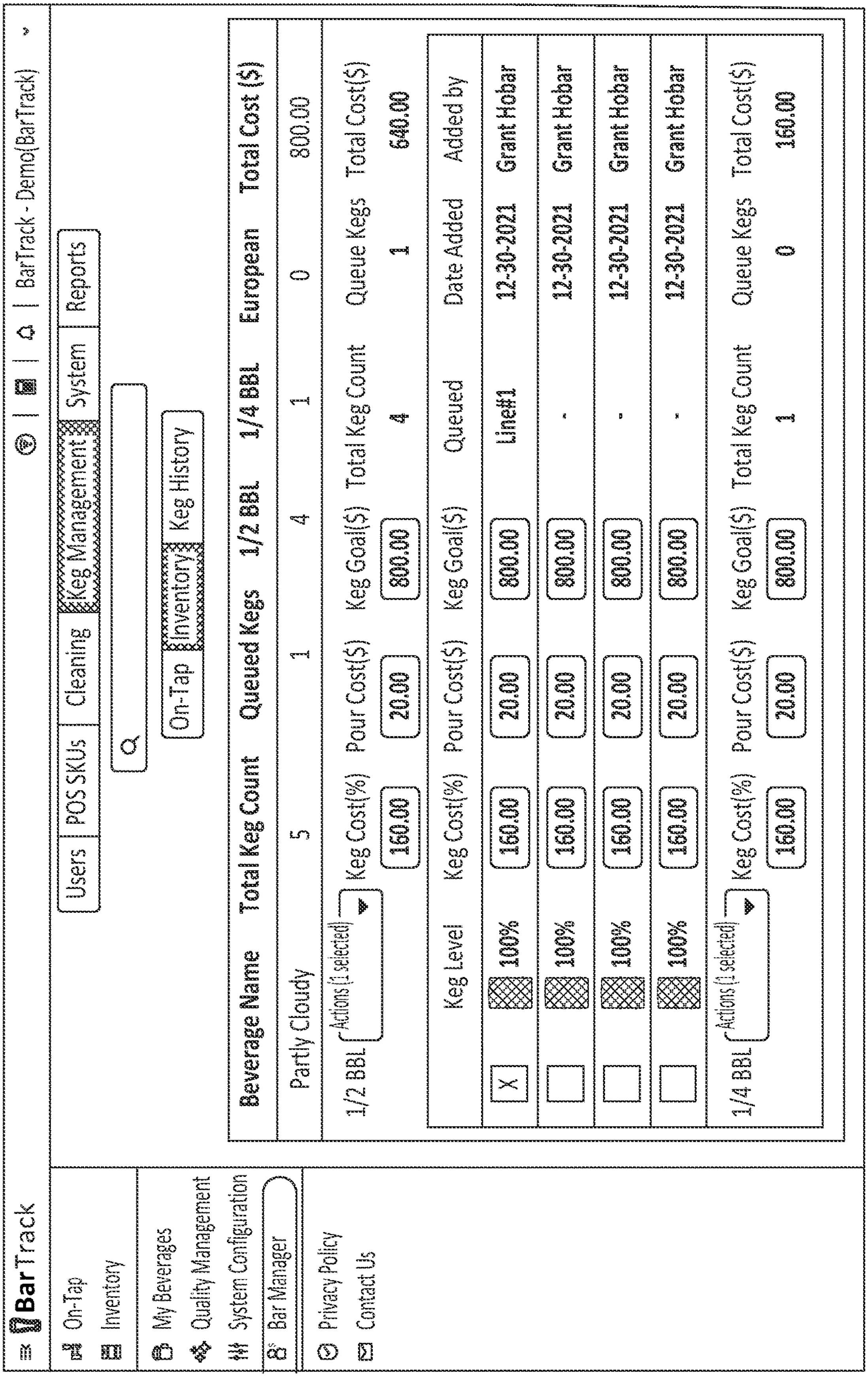

Referring to FIG. 12, managers are able to perform bulk Keg Management—enabling them to make wide-ranging adjustments to kegs, as well as visualizing where exactly their inventory is currently allocated. This section is being expanded upon to gravitate towards presenting PAR (Periodic Automate Replacement) which will help beverage system operators understand when they need to order more product to ensure they do not run out.

The key components of the interface disclosed with reference to FIG. 12 include:

Real-Time on-hand inventory
- Inventory/Queued
- Total Cost

Bulk Actions
- Removal (e.g., sold, mistake, skunked, etc.)
- Adjust Pricing
  - Keg Cost & Keg Goal
    - If beverage system operators determine they need to make a modification they have the ability to apply the changes to single kegs, all kegs On-Tap, all kegs in Inventory, or all kegs Historically—in addition to being able to set the new values as the new default for all kegs of that type moving forward New Reporting
- A new report that is specifically oriented towards providing on-hand inventory, consumed inventory, and PAR-related information is currently in development.

Figure 13:
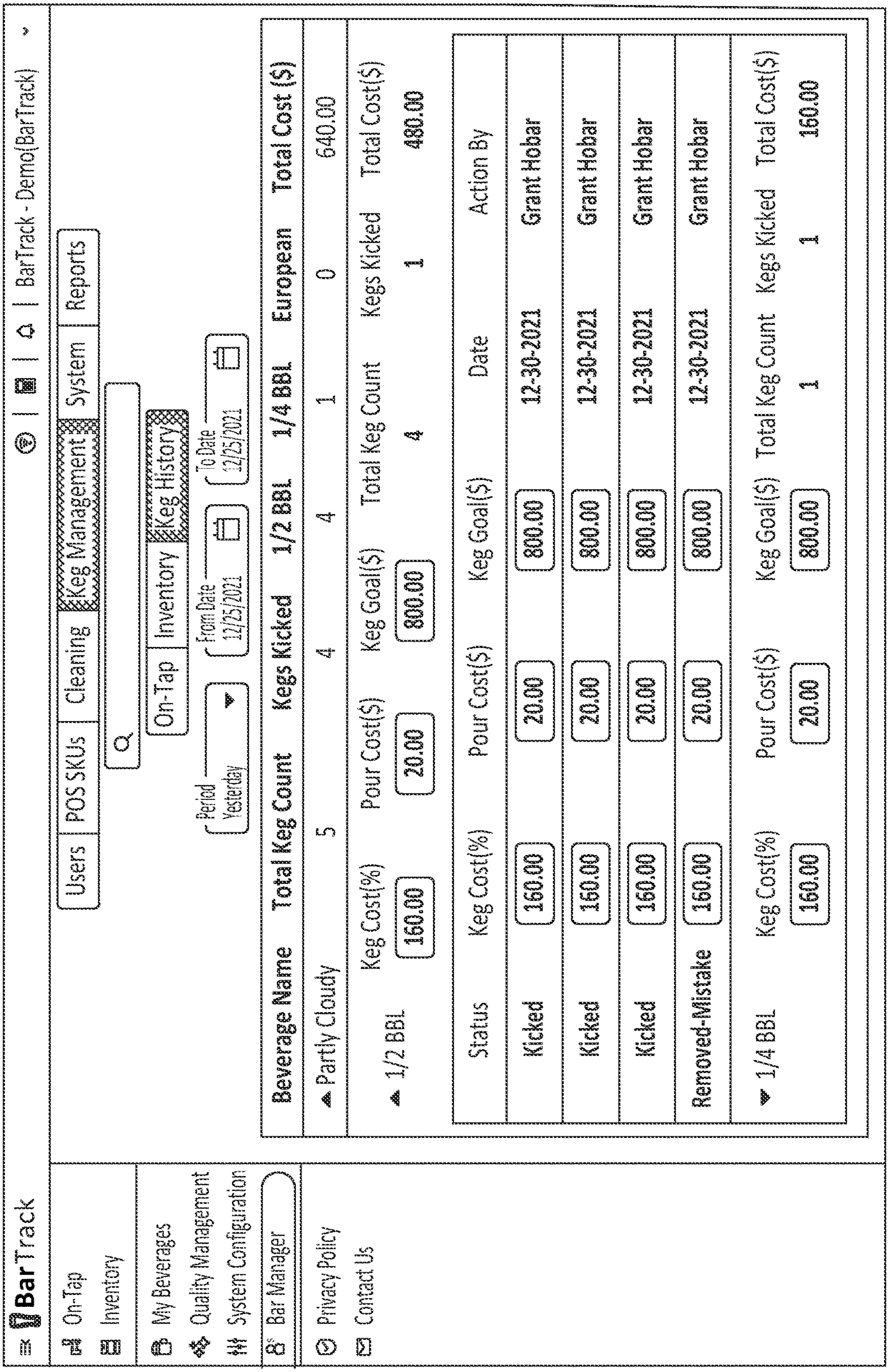

Referring to FIG. 13, managers are able to perform bulk Keg Management—enabling them to make wide-ranging adjustments to kegs, as well as visualizing where exactly their inventory is currently allocated. This section is being expanded upon to gravitate towards presenting PAR (Periodic Automate Replacement) which will help beverage system operators understand when they need to order more product to ensure they do not run out.

The key components of the interface disclosed with reference to FIG. 13 include:

Keg History
- Ability to specify date ranges to determine how much product was consumed over a particular period
- Timestamped data to indicate who performed what actions on particular kegs Adjust Pricing
- Keg Cost & Keg Goal
  - If beverage system operators determine they need to make a modification they have the ability to apply the changes to single kegs, all kegs in Inventory, or all kegs Historically—in addition to being able to set the new values as the new default for all kegs of that type moving forward New Reporting
- A new report that is specifically oriented towards providing on-hand inventory, consumed inventory, and PAR-related information is currently being developed.

Figure 14:
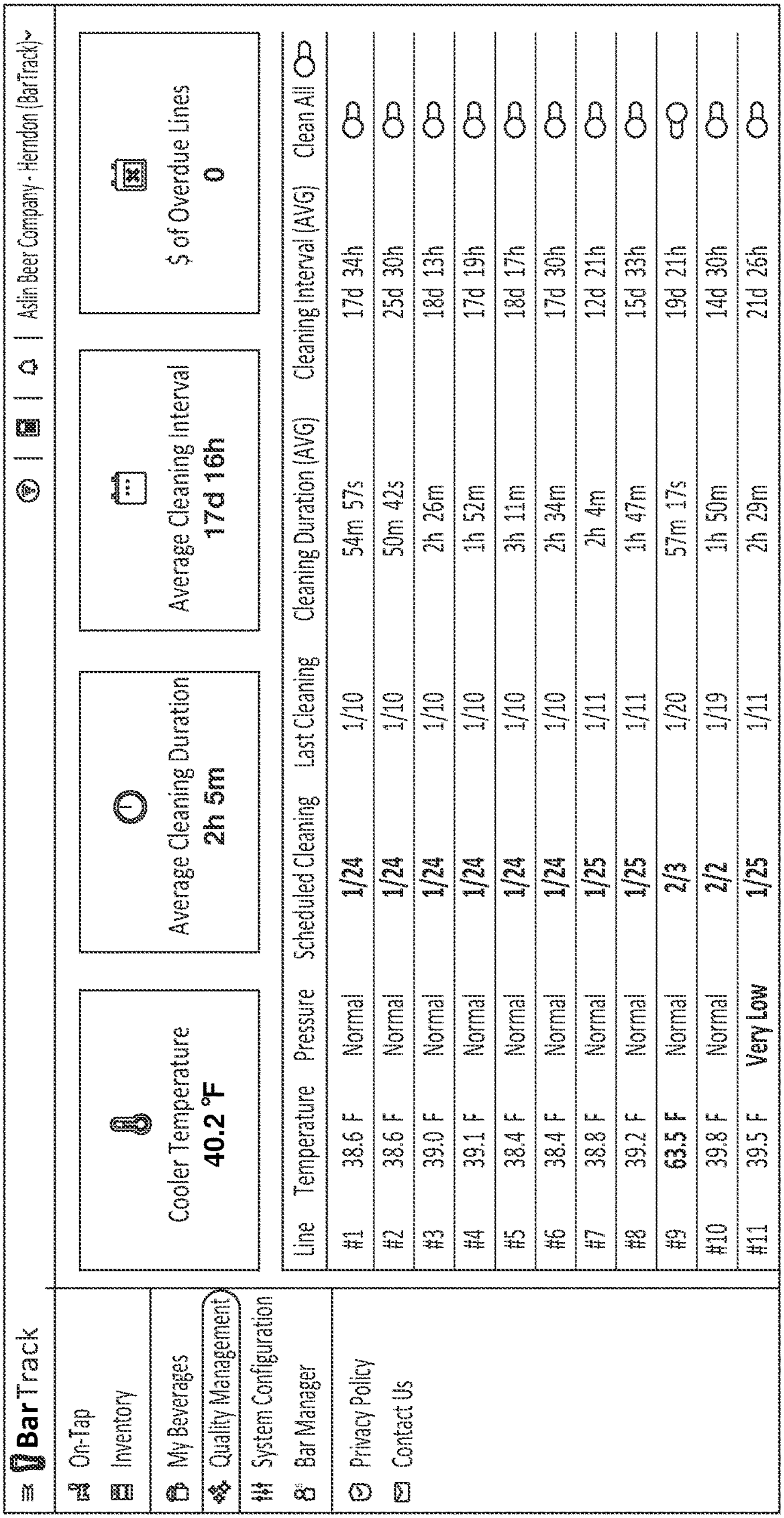

Referring to FIG. 14, all environmental and quality-related information generated by the beverage monitoring system is presented to the beverage system operator. A concise high-level overview of the current state of all the beverage distribution lines 111 at a particular location is provided.

The key components of the interface disclosed with reference to FIG. 14 include:

Ability to breakdown information by Cooler
- Cooler Health (in development)
  - Graphical visualization of Cooler & Line temperature over a period of time
  - Humidity Line Health
- Current Temperature
  - Updated every Pour or Last Heartbeat (5-minute interval)—whichever is more recent
- Current Pressure
  - (n.b.—Updated only on Pours)

Cleaning Management
- # of Overdue Cleanings
- Last Cleaning
- Scheduled Cleaning
- Average Cleaning Duration
- Average Cleaning Interval
- Ability to toggle & observe which lines are currently being cleaned Line Diagnostics (in development)
- Interactive walkthrough of how to remedy draft beverage system health-related issues
  - e.g.—Low/High Pressure.

Figure 15:
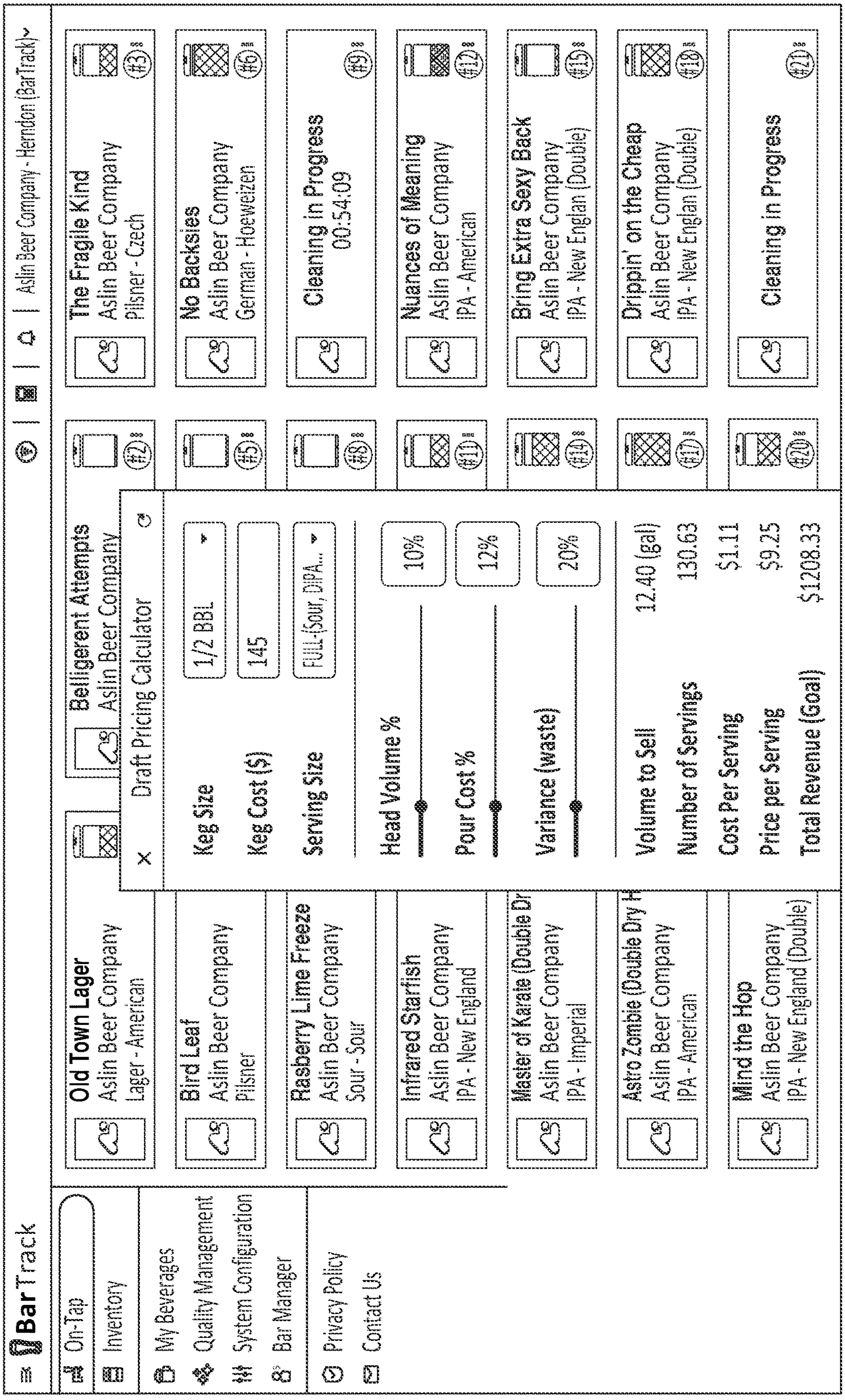
Figure 16:
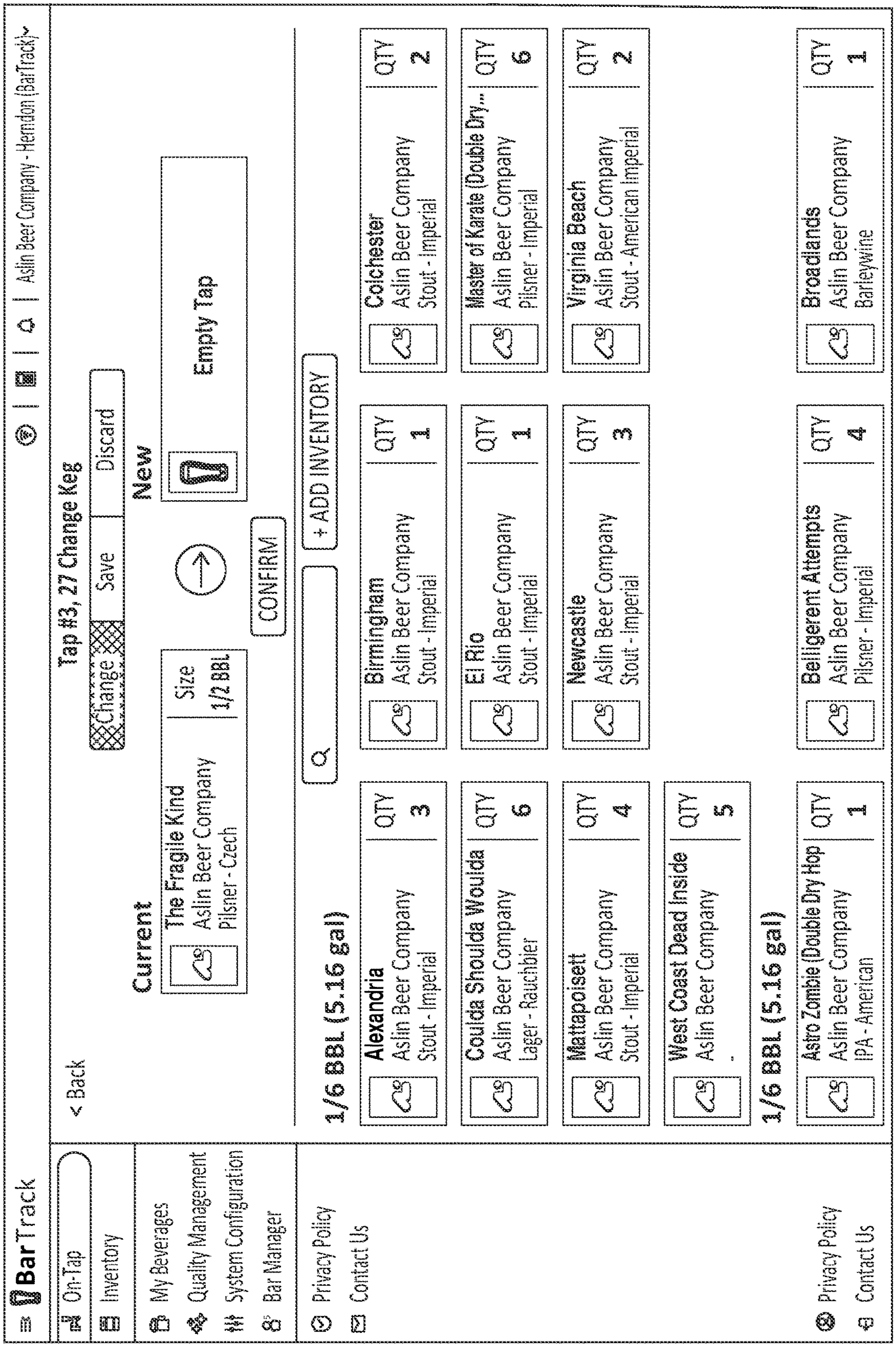
Figure 17:
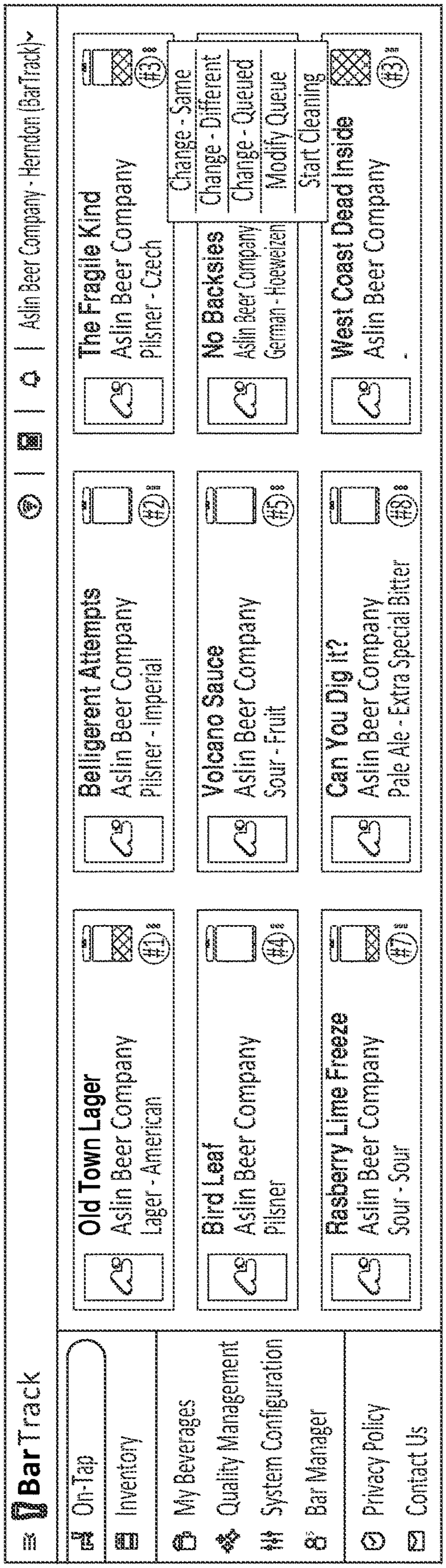

Referring to FIG. 15, a useful widget that is bundled into the application is the draft pricing calculator of the beverage monitoring system 10 that allows beverage system operators to input several variables about their keg and general draft performance metrics in order to determine what they should be pricing their product at in order to hit their goals. In addition to determining pricing, customers can also use this tool as a what-if scenario generator where they can see the impact that things like variance, head percentage, or pour cost has on the general profitability of their product.

The key components of the interface disclosed with reference to FIG. 15 include:

Ability to calculate recommended draft pricing

Ability to simulate various scenarios.

From time to time, it may become necessary to update the operational firmware or calibration parameters within the sensor or its corresponding cabinet controller circuitry containing various other sensor communications interfaces. For the case where firmware needs to be remotely updated, a "bootloader" may be implemented within the beverage sensor itself and/or the sensor cabinet controller communicating with it that is able to receive an "application" firmware payload along with specific commands to update itself. This way, various bug fixes or enhancements may be deployed without physical user intervention. In the case where calibration coefficients may need to be updated remotely, the bootloader or application firmware may process and store updated coefficients in local nonvolatile memory to continuously enhance the performance and calibration of the sensor over time as more and more data is collected and analyzed. Dynamically updated calibration coefficients may lead to a more linear and/or more accurate response of temperature sensors, multi-channel spectral sensors, flow sensors, and the like.

In addition to the thermal equilibrium described above with respect to the temperature of beer in the keg and ambient temperature in the cooler, pressure equilibrium may also be a factor in identifying and/or diagnosing issues with dispensement of a beer. For example, line pressure is a function of multiple variables, including the length and diameter of the beverage distribution lines 111, the material the beverage distribution lines 111 is made of, regulated gas pressure, the beverage viscosity, and the flow rate of the beer. A draft beverage system may be equalized line to line at a set, predetermined flow rate, such as 1 gallon per minute. There may be line length differences or barometric pressure differences that affect the flow rate and change it from the set, predetermined flow rate. In addition, de-gassing can be caused by low- or high-pressure, or high temperatures. Consolidating flow sensor data and environmental sensor data (e.g., temperature) in the gateway 200 or off-site resources 118 for analysis may allow a beverage monitoring system to analyze various types of data and how the factors are affecting optimum beer flow to remotely diagnose problems and diagnose potential problems earlier by being able to identify the root problem from the consolidated data.

As is apparent from the above description, certain example embodiments provide several technological improvements, enhancements, and/or advantages over existing technological processes. For example, one benefit of some example embodiments is the improvement in quality and efficiency of dispensement of fluids, such as draft beverages, and a reduction in waste associated with the dispensement. Accordingly, the use of some example embodiments results in improved functioning of a fluid dispensement system and, therefore, constitutes an improvement at least to the technological field of monitoring fluid dispensement, among others.

The embodiments disclosed above provide for a variety of parameters that may be measured, used to extrapolate data, presented to operators, and/or used for other purposes in association with the operation of the system 100 for monitoring equilibrium of and dispensement using a draft beverage system. The monitored parameters, extrapolated data, and operational insights may be used in various combinations that are specifically adapted to meet the needs of the operator of the system 100. The information and controls offered by the present beverage monitoring system 10 provide a wide variety of business advantages, including, but not limited to, tax benefits based upon the quantification of waste, improved efficiency as employees improve their pouring skills, optimized cleanliness based upon feedback systems, enhanced monitoring of keg use and inventory, identification of potential theft due to "on the house" drinks.

In addition to the many functionalities discussed above, various additional features are contemplated. For example, it is contemplated that the hardware disclosed above in accordance with the disclosed beverage monitoring system 10 may be repurposed to act as the brains for other draft system equipment. Many other draft systems use turbine flow meters which have numerous issues associated with them. By introducing technology like the flow meters, pressure sensors, etc. discussed above, these draft systems can be retrofitted to provide more reliable hardware that is virtually maintenance-free, in addition to more accurate data resolution.

By way of example, the advancements of the present beverage monitoring system 10 may be applied to self-pour beverage dispensing systems. The integration of the advancements of the present beverage monitoring system 10 with self-pour beverage dispensing systems provides for enhanced accuracy where the user is charged for the specific amount of beer that is poured and accuracy and precision are of great importance.

The hardware disclosed above in accordance with the disclosed beverage monitoring system 10 may also be used in the development of automatic line cleaning systems. The hardware disclosed above in accordance with the disclosed beverage monitoring system 10 captures flow data and tracks how much has passed thereby allowing an automatic line cleaning system to know when to open/close various valves and "turn off" the cleaning. By doing this, beverage system operators know when line cleanings have occurred and enables customers to perform shorter cleanings with non-caustic solutions.

Foamy draft beer can be caused by the buildup of bacteria, yeast, mold, and beer stones within a beverage distribution line 111. Unclean beverage distribution lines 111 lower the quality and taste of beer. It is important to regularly clean beverage distribution lines 111, faucets, and keg couplers to ensure the dispense of high quality beer. To avoid skunk beer, beverage distribution lines 111 and equipment need to be regularly cleaned every two weeks. In some states, the two-week timeframe for cleaning is required by law. Properly cleaning your beverage distribution lines 111 dissolves proteins, hop resins, bio-films, mold, bacteria, and yeast. An acid cleaning, to dissolve mineral buildup such as beer stone, should also be done every three months.

One of the many benefits the beverage monitoring system 10 provides is that it is able to digitally keep track of when line cleanings occurred, how long they occurred, who performed them, and how effective they were. There are several different types of cleanings, from a short rinse to a long-soak and then subsequent recirculation of the cleaning solution through the draft beverage system. Customers are able to specify which types of cleanings they are performing so that the information can be properly categorize and understood as to what to expect in terms of flow data. Customers can write-off beer that is lost due to line cleanings for tax purposes if they can quantify and prove how much—the beverage monitoring system 10 offers this pour data Oftentimes distributors offer free line cleaning services as part of their "bundles" and unfortunately not all of their employees are honest with their work and don't perform effective cleanings (or any cleaning at all) when they go to service a location. The beverage monitoring system 10 can assess the effectiveness of a cleaning (or absence) and alert beverage system operators if things are subpar. Customers with dirty beverage distribution lines 111 can experience several scenarios as a result of their decision to infrequently clean their beverage distribution lines 111 and diminish the customer experience: Customer's don't order another beer, customers ask for another beer (or refund), customers switch to profit-sucking bottles or cans, or customers leave (and don't return). Certain states mandate line cleanings for draft beverage systems and are required to furnish cleaning logs indicating that cleanings were dutifully performed.

Some example embodiments of the present disclosure may be comprised of the various components, e.g., a gateway, a sensor assembly, and a dispenser, physically separate from each other. In certain embodiments, one or more of these components can be combined into a single component, e.g., a gateway and a sensor assembly may be combined together into one component providing the combined operations described with respect to each component above.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A beverage monitoring system for a beverage system including a pressurized gas source, pressurized gas regulators, pressurized gas distribution lines, beverage distribution lines, beverage vessels, and beverage dispensers, the beverage monitoring system comprising:

at least one gateway that includes a processor and network interfaces connected to beverage dispensers and sensor assemblies;

a sensor assembly including at least one flow sensor, the at least one flow sensor applies ultrasound to monitor flow and the at least one flow sensor includes a processor, an ultrasonic front-end processor, two ultrasonic transducers, and a temperature sensor;

the two ultrasonic transducers also provide signal quality metrics such that when signal strength decreases, such a decrease in signal strength is used to determine an amount of air or other gases in the beverage distribution lines, wherein the signal quality metrics are applied in a rule-based evaluation system that runs each time a collection of samples or a single sample is received, wherein each time a pour is initiated: (1) a type and identification is sent into a queue for asynchronous processing: (2) a message queued in Step 1 is received and information is retrieved for processing, the information retrieved including a standard deviation of a sample signal strength; (3) data from Step 2 is evaluated based on a saved rule; and (4) an outcome from Step 3, either true or false, is used to initiate actions based on the saved rule;

the sensor assembly further including at least one pressure sensor and at least one color sensor, the at least one pressure sensor and at least one color sensor being housed within the at least one flow sensor;

wherein data from the sensor assembly are configured to run diagnostics to diagnose a potential problem, provide insights into operation of the beverage system, or provide consolidated information for correlation with point-of-sale data.

2. The beverage monitoring system according to claim 1, wherein the beverage monitoring system performs one or more actions based on consolidated information or other information to modify flow of fluid within the beverage system.

3. The beverage monitoring system according to claim 1, wherein the sensor assembly further includes at least one environmental sensor.

4. The beverage monitoring system according to claim 3, wherein the at least one environmental sensor measures and monitors cooler barometric pressure, humidity, ambient temperature, or ambient gas concentrations within the cooler.

5. The beverage monitoring system according to claim 1, wherein the ultrasonic front-end processor causes an ultrasonic signal to be sent through fluid, which travels through a channel, at a known nominal speed along a signal path of known length in one direction, from one ultrasonic transducer to the other ultrasonic transducer, and then to be sent back again in the opposite direction, wherein a difference between signal travel time in each direction may be directly correlated to fluid flow speed because a measured speed of that signal is increased or decreased from its nominal speed by that flow speed, as that signal travels with or against the flow, respectively.

6. The beverage monitoring system according to claim 1, wherein the at least one flow sensor provides flow data.

7. The beverage monitoring system according to claim 1, wherein the at least one color sensor is a photometer and/or spectrophotometer.

8. The beverage monitoring system according to claim 1, wherein the at least one color sensor allows for determination of a specific beverage traveling through the beverage distribution lines.

9. The beverage monitoring system according to claim 1, wherein the gateway receives data from a sensor network and processes that data to determine that a pour has started and when a tap should close to end the pour.

10. The beverage monitoring system according to claim 1, wherein the beverage monitoring system includes a tracking device secured to each keg shell to enhance a cleaning process, optimize transition of the keg shells for use in conjunction with different types of beers and beverages, maintain a record of contents of various keg shells.

11. The beverage monitoring system according to claim 1, wherein the beverage monitoring system includes a cooler control and monitoring assembly and a glycol cooling control and monitoring assembly.

* * * * *